United States Patent
Shindo et al.

(10) Patent No.: US 10,236,478 B2
(45) Date of Patent: Mar. 19, 2019

(54) METHOD FOR PRODUCING LITHIUM ION CELL AND LITHIUM ION CELL

(71) Applicant: SANYO CHEMICAL INDUSTRIES, LTD., Kyoto-shi, Kyoto (JP)

(72) Inventors: Yasuhiro Shindo, Kyoto (JP); Yusuke Mizuno, Kyoto (JP); Kenichi Kawakita, Kyoto (JP); Yasuhiko Ohsawa, Yokohama (JP); Yuki Kusachi, Yokohama (JP); Hajime Satou, Yokohama (JP); Hiroshi Akama, Kyoto (JP); Hideaki Horie, Kyoto (JP)

(73) Assignee: SANYO CHEMICAL INDUSTRIES, LTD., Kyoto-shi (JP)

( * ) Notice: Subject to any disclaimer, the term of this patent is extended or adjusted under 35 U.S.C. 154(b) by 0 days.

(21) Appl. No.: 15/426,759

(22) Filed: Feb. 7, 2017

(65) Prior Publication Data

US 2017/0237046 A1   Aug. 17, 2017

Related U.S. Application Data

(60) Provisional application No. 62/294,860, filed on Feb. 12, 2016.

(51) Int. Cl.
| | |
|---|---|
| H01M 2/02 | (2006.01) |
| H01M 4/66 | (2006.01) |
| H01M 2/10 | (2006.01) |
| H01M 4/505 | (2010.01) |
| H01M 4/525 | (2010.01) |
| B29C 70/84 | (2006.01) |

(Continued)

(52) U.S. Cl.
CPC ............ *H01M 2/0277* (2013.01); *B29C 70/84* (2013.01); *B29C 70/88* (2013.01); *H01M 2/026* (2013.01); *H01M 2/0215* (2013.01); *H01M 2/30* (2013.01); *H01M 4/0478* (2013.01); *H01M 4/66* (2013.01); *H01M 10/049* (2013.01); *H01M 10/0436* (2013.01); *B29K 2105/16* (2013.01); *B29K 2995/0005* (2013.01); *B29L 2031/3468* (2013.01); *H01M 10/052* (2013.01); *H01M 2220/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0126655 A1* | 7/2004 | Hisamitsu | ............... | H01M 2/26 429/162 |
| 2005/0186378 A1* | 8/2005 | Bhatt | .................... | B82Y 10/00 428/36.9 |

(Continued)

FOREIGN PATENT DOCUMENTS

JP   2013-048041 A   3/2013

*Primary Examiner* — Jonathan G Leong
*Assistant Examiner* — Christopher P Domone
(74) *Attorney, Agent, or Firm* — Oliff PLC

(57) ABSTRACT

Provided is a method for producing a lithium ion cell having an outer container composed of a resin molded article, and the method for producing a lithium ion cell includes a current collector forming process of forming, on the inner side of an outer container, each of a first electrode current collector and a second electrode current collector composed of an electrically conductive polymer composition by using a molding die.

4 Claims, 15 Drawing Sheets

(51) Int. Cl.

| | |
|---|---|
| *H01M 4/60* | (2006.01) |
| *H01M 4/587* | (2010.01) |
| *H01M 4/40* | (2006.01) |
| *H01M 4/38* | (2006.01) |
| *H01M 4/62* | (2006.01) |
| *B29C 70/88* | (2006.01) |
| *H01M 10/0525* | (2010.01) |
| *H01M 4/58* | (2010.01) |
| *H01M 2/30* | (2006.01) |
| *H01M 4/04* | (2006.01) |
| *H01M 10/04* | (2006.01) |
| *B29L 31/34* | (2006.01) |
| *B29K 105/16* | (2006.01) |
| *H01M 10/052* | (2010.01) |

(56) References Cited

U.S. PATENT DOCUMENTS

2014/0152264 A1\* 6/2014 Schaefer ............. H01M 2/0272
 320/128
2015/0010833 A1\* 1/2015 Amendola .......... H01M 4/8647
 429/406

\* cited by examiner

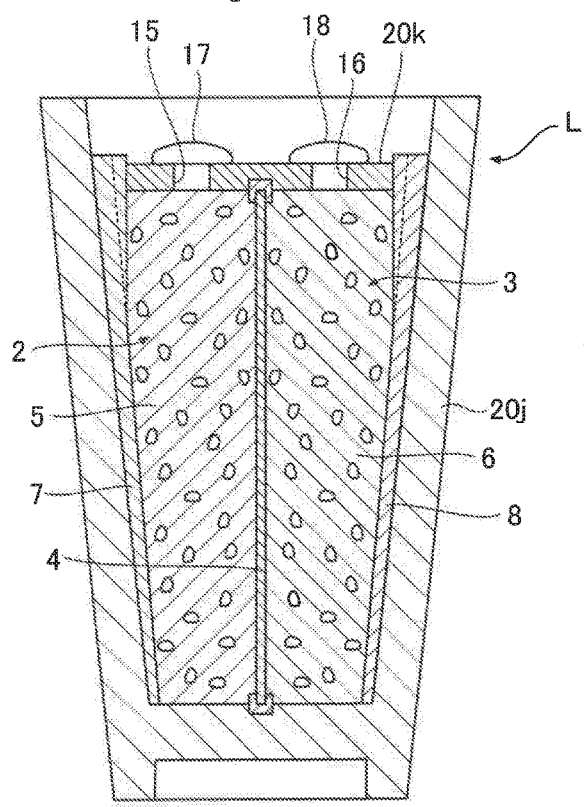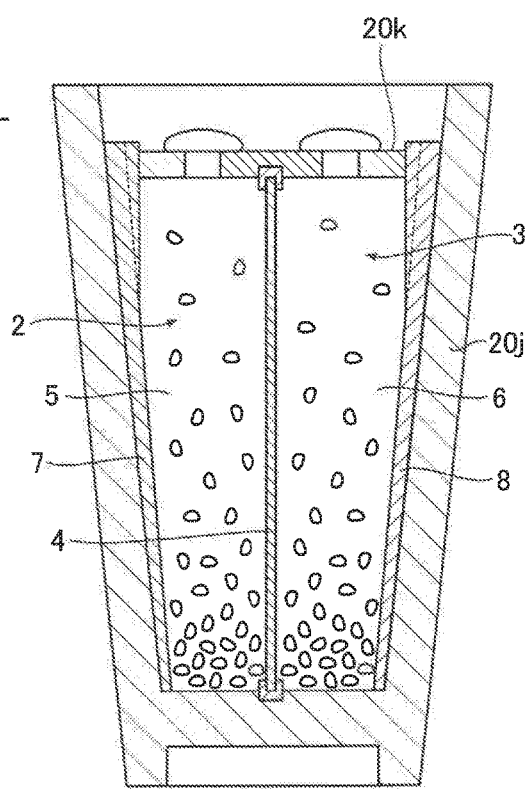

METHOD FOR PRODUCING LITHIUM ION CELL AND LITHIUM ION CELL

BACKGROUND

Technical Field

The present invention relates to a method for producing a lithium ion cell and a lithium ion cell. More specifically, the present invention relates to a method for producing a lithium ion cell including a process of forming integrally a current collector on the inner side of an outer periphery container composed of a resin molded article, and a lithium ion cell which is suitable for manufacture using the producing method.

Related Arts

A lithium ion cell is a small-sized and light-weighted secondary cell having high capacity, and is recently used for various applications. In accordance with a broadening use of a lithium ion cell and a decreasing size of an electronic device in which a lithium ion cell is used as a power source, currently there is a demand for having a lithium ion cell with light weight and high capacity.

As a cell with light weight, a thin type cell using a specific film exterior body is known, for example (JP 2013-48041 A).

To have high capacity, it is efficient to increase the amount of an electrode active material. However, according to the above described technique of a related art, it is not possible to increase the amount of an electrode active material which can be used and thus it remained difficult to increase the capacity as the lithium ion cell is a thin type.

Furthermore, to have high capacity, it is necessary to have a module in which a long thin type cell is wound or a module in which many thin type cells are used in combination and connected serially. However, from the viewpoint of safety, the formed module needs to be accommodated in an outer periphery module container like metal, and thus it is difficult to achieve both the high capacity and light weight.

The present invention is devised in view of the problems described above, and one object of the invention is to provide a method for producing a lithium ion cell capable of obtaining both the high capacity and light weight, and a lithium ion cell.

SUMMARY

The present invention relates to a method for producing a lithium ion cell having an outer container composed of a resin molded article, and based on the method for producing a lithium ion cell including a current collector forming process of forming, on the inner side of the outer container, each of a first electrode current collector and a second electrode current collector composed of an electrically conductive polymer composition by using a molding die, at least one of the above problems is solved. Furthermore, in the present invention, the first electrode may be a positive electrode or a negative electrode. When the first electrode is a positive electrode, the second electrode is a negative electrode and when the first electrode is a negative electrode, the second electrode is a positive electrode.

BRIEF DESCRIPTION OF DRAWINGS

FIGS. 15A and 15B are cross-sectional views illustrating an effect of another process additionally performed for the method for producing a lithium ion cell of the present invention.

DETAILED DESCRIPTION

Figure 1:
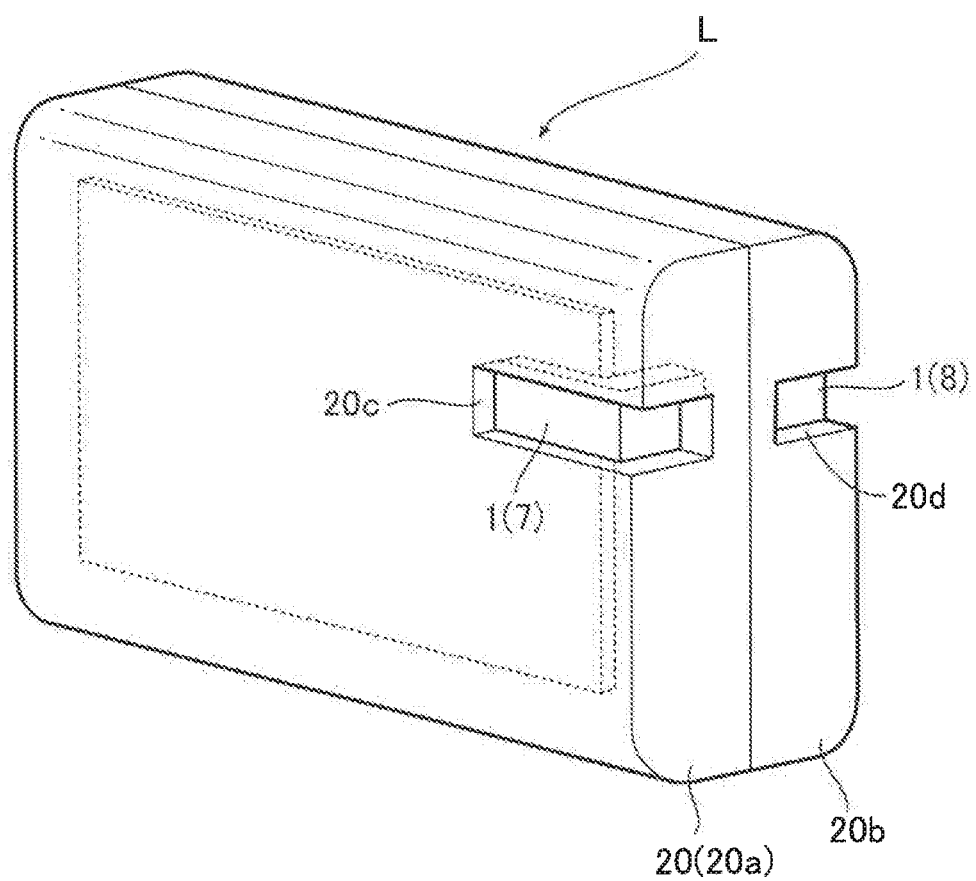
FIG. 1 is a perspective view illustrating, among lithium ion cells produced by a production method of the present invention, a lithium ion cell according to a first embodiment.
Figure 2:
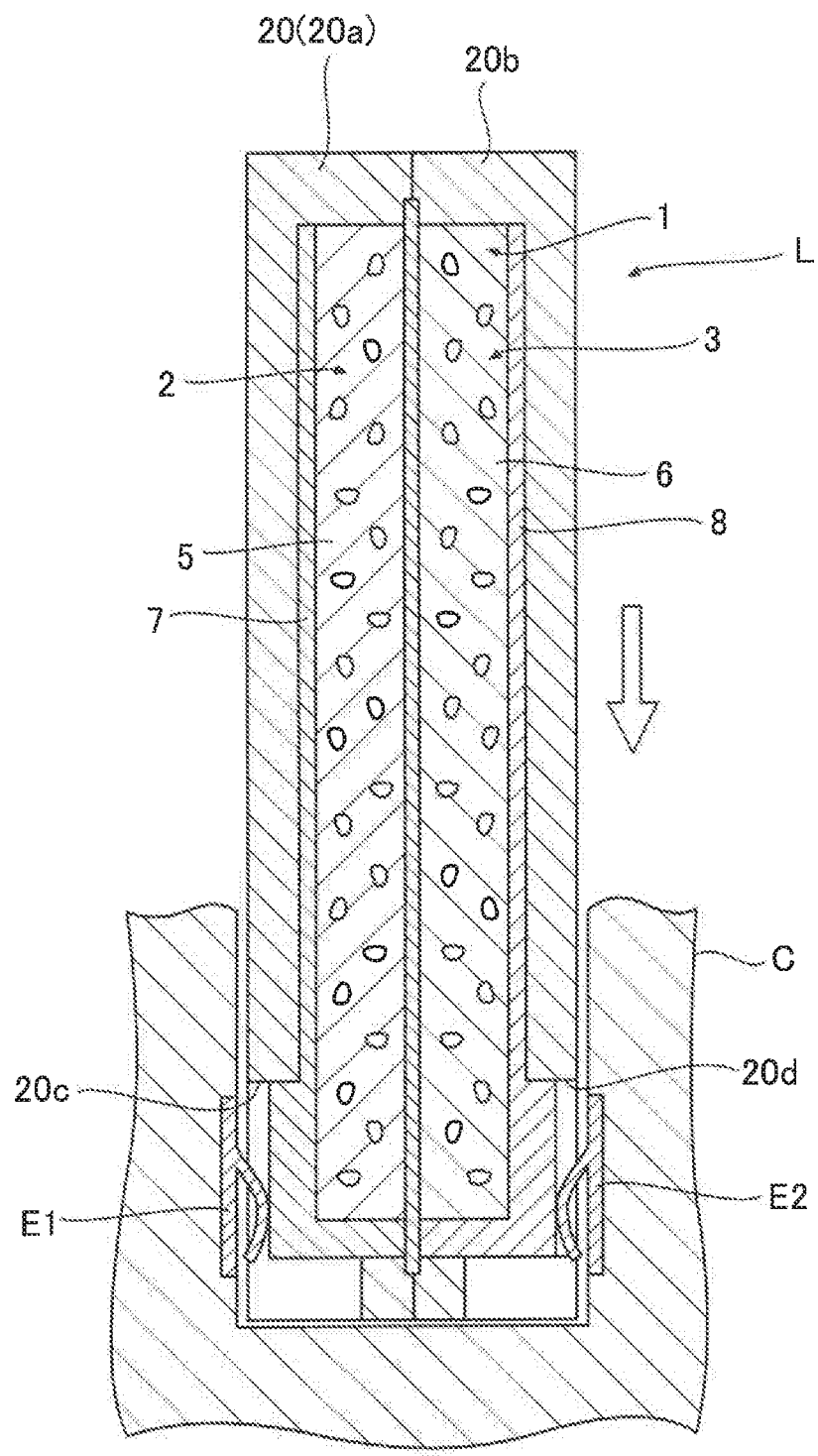
FIG. 2 is a cross-sectional view illustrating a state in which the lithium ion cell illustrated in FIG. 1 is connected to a connector.

Referring to FIG. 1 and FIG. 2, a lithium ion cell of the first embodiment that is produced by a production method of the present invention is described. FIG. 1 is a perspective view illustrating a lithium ion cell according to the first embodiment that is produced by the production method of the lithium ion cell of the present invention, and FIG. 2 is a cross-sectional view illustrating a state in which the lithium ion cell according to the first embodiment illustrated in FIG. 1 is connected to a connector.

The lithium ion cell L produced by the production method of the present invention is provided with, as an outer container of the lithium ion cell L, a cell outer container 20 having approximately rectangular-parallelepiped shape as illustrated in FIG. 1 (hereinbelow, it may be simply referred to as the container 20 or the outer container 20). As illustrated in FIG. 1 and FIG. 2, the container 20 is divided into two parts in its length direction (direction toward left and right when seen from the right front in FIG. 1), and the divided parts consist of a pair of the first vided container 20a and the second divided container 20b. As illustrated in FIG. 2, the container 20 has a hollow space formed therein and the power generation part 1 of the lithium ion cell L, which will be described later, accommodated in the hollow space. On the lateral side of the container 20, a divide line for dividing the container 20 into the first divided container 20a and the second divided container 20b is formed, and on one end of each of the first divided container 20a and the second divided container 20b (front end on right side in FIG. 1), each of the cutout part 20c and 20d, which penetrates the inside of the container 20, is formed, and through the cutout part 20c and 20d, the power generation part 1 is exposed to outside.

As illustrated in FIG. 2, on an inner side of first divided container 20a and the second divided container 20b except the end part opposite to the cutout part 20c and 20d (inner top surface in FIG. 2), each of the positive electrode current collector 7 and the negative electrode current collector 8, which are composed of an electrically conductive polymer composition, is disposed. As illustrated in FIG. 2, it is preferable that, in the exposed part of the cutout part 20c and 20d, the positive electrode current collector 7 and the negative electrode current collector 8 are formed thicker than other part (the inner surface of first divided container 20a and the second divided container 20b in FIG. 2).

Between the first divided container 20a and the second divided container 20b, a separator 4 with approximately flat plate shape is disposed to divide a hollow space between the first divided container 20a and the second divided container 20b into the positive electrode chamber 2 and the negative electrode chamber 3, respectively. Furthermore, in the positive electrode chamber 2 and the negative electrode chamber 3, a positive electrode composition and a negative electrode composition are filled, respectively, to form the positive electrode active material layer 5 and the negative electrode active material layer 6, respectively. Furthermore, each of the positive electrode composition and the negative electrode composition is a composition containing positive electrode active material particles or negative electrode active material particles, and it is preferably a composition which further contains an electrolyte solution.

By integrally sealing the first divided container 20a and the second divided container 20b in which the positive electrode active material layer 5 and the negative electrode active material layer 6 are formed, respectively, the lithium ion cell L of this embodiment having a power generation part 1 obtained by stacking in the order the first electrode current collector 7, the first electrode active material layer 5, the separator 4, the second electrode active material layer 6, and the second electrode current collector 8, and the cell outer container 20 composed of a resin molded article is formed.

Furthermore, the sealing of the first divided container 20a and the second divided container 20b may be performed by direct melt welding like ultrasonic melt welding or by sealing using a sealing member.

Furthermore, from the viewpoint of increasing the current drawing efficiency from the positive electrode current collector 7 and the negative electrode current collector 8, between the first divided container 20a and the positive electrode current collector 7 and between the second divided container 20b and the negative electrode current collector 8, an electrically conductive layer like metal foil may be formed. The positive electrode current collector 7 and the negative electrode current collector 8 are composed of an electrically conductive polymer composition, and they have lower electric conductivity compared to a metal current collector. For such reasons, by forming an electrically conductive layer like metal foil, the current drawing efficiency can be improved.

The lithium ion cell L produced by the production method of the present invention is a detachable battery mounted in a so-called electronic device. As illustrated in FIG. 2, when mounted in a cradle C for charge, each of the positive electrode current collector 7 and the negative electrode current collector 8 of the power generation part 1, which is exposed through the cutout part 20c, 20d, is brought into electric contact with each of the connector electrode E1 and E2 of cradle C for charge, and thus the lithium ion cell L can be charged.

The positive electrode active material layer 5 formed by filling of a positive electrode composition is preferably a non-bound material containing a positive electrode active material particle and an electrolyte solution, and similarly, the negative electrode active material layer 6 formed by filling of a negative electrode composition is preferably a non-bound material containing a negative electrode active material particle and an electrolyte solution.

In the specification, the express "filling" means that the positive electrode active material particle and the negative electrode active material particle are contained in the positive electrode chamber 2 and the negative electrode chamber 3, respectively. Preferably, it represents a state in which the positive electrode active material particle and electrolyte solution are contained in the positive electrode chamber 2 while the negative electrode active material particle and electrolyte solution are contained in the negative electrode chamber 3. Each of the positive electrode active material particle and electrolyte solution contained in the positive electrode chamber 2 and the negative electrode active material particle and electrolyte solution contained in the negative electrode chamber 3 are preferably in a state in which the positive electrode active material particle or the negative electrode active material particle is homogeneously mixed with an electrolyte solution.

Furthermore, in the specification, the expression "non-bound material" means the positive electrode active material layer 5 or the negative electrode active material layer 6 which is not bound by a well-known binder that is generally used for a positive electrode or a negative electrode of a known lithium ion cell. Namely, it indicates a state in which each of the positive electrode active material particle and negative electrode active material particle contained in the positive electrode active material layer 5 or the negative electrode active material layer 6 can move according to an external force. Thus, the positive electrode active material particle and negative electrode active material particle can move following a deformation of the positive electrode active material layer 5 and the negative electrode active material layer 6, and thus it is not likely that the electrical connection with neighboring positive electrode active material particle and negative electrode active material particle is disconnected. Meanwhile, according to a lithium ion cell of a related art, to maintain the structure of an active material layer or an electrically conductive network, an electrode active material, a conductive aid, or the like are bound to each other using a binder. Accordingly, it does not allow a state in which the positive electrode active material particle and negative electrode active material particle can move.

Furthermore, although the positive electrode active material layer 5 and the negative electrode active material layer 6 as a non-bound material generally have a slurry state, depending on weight ratio between the positive electrode active material particle or negative electrode active material particle and an electrolyte solution, there can be a state in which it is like a gel, a mud, a clay, or close to powder.

In the present invention, in order to have the positive electrode chamber 2 and the negative electrode chamber 3 filled with a positive electrode composition or a negative electrode composition, it is possible that the positive electrode active material particle or negative electrode active material particle is directly added to the positive electrode chamber 2 or the negative electrode chamber 3, or an electrode composition (positive electrode composition or negative electrode composition) as a mixture of particles of a positive electrode active material or a negative electrode active material and an electrolyte solution is added to each of the positive electrode chamber 2 and the negative electrode chamber 3. When the positive electrode active material particle or negative electrode active material particle is directly added to the positive electrode chamber 2 or the negative electrode chamber 3, by adding an electrolyte solution after that, each of the positive electrode chamber 2 and the negative electrode chamber 3 can be filled with a positive electrode composition or a negative electrode composition.

When each of the positive electrode chamber 2 and the negative electrode chamber 3 is filled with a positive electrode active material particle and a negative electrode active material particle, it is preferable that the positive electrode active material particle or negative electrode active material particle is evenly filled in each of the positive electrode chamber 2 and the negative electrode chamber 3 after performing an operation of applying vibration or impact to the container 20.

The positive electrode composition is composed of a positive electrode active material particle, and examples of the positive electrode active material particle include a composite oxide of lithium and a transition metal (for example, $LiCoO_2$, $LiNiO_2$, $LiMnO_2$, and $LiMn_2O_4$), an oxide of a transition metal (for example, $MnO_2$ and $V_2O_5$), a sulfide of a transition metal (for example, $MoS_2$ and $TiS_2$), and an electrically conductive polymer (for example, polyaniline, pollypyrrole, polythiophene, polyacetylene, poly-p-phenylene, and polycarbazole).

Furthermore, the negative electrode composition is composed of a negative electrode active material particle, and examples of the negative electrode active material particle include graphite, non-graphatizable carbon, amorphous carbon, calcined product of a polymer compound (for example, phenol resin, furan resin, or the like which is calcined and carbonized), cokes (for example, pitch cokes, needle cokes, and petroleum oil cokes), carbon fiber, an electrically conductive polymer (for example, polyacetylene and polyquinoline), tin, silicon, metal alloy (for example, lithium-tin alloy, lithium-silicon alloy, lithium-aluminum alloy, and lithium-aluminum-manganese alloy), and a composite oxide of lithium and a transition metal (for example, $Li_4Ti_5O_{12}$).

The positive electrode active material particle and the negative electrode active material particle are preferably a coated active material particle of which the surface is at least partially coated with a layer containing a conductive aid and a polymer.

When the each surface of the positive electrode active material particle and the negative electrode active material particle is coated with a layer containing a conductive aid and a polymer (also referred to as a resin for coating), a volume change of an electrode is alleviated so that the electrode expansion can be suppressed. As for the polymer to be contained in a coating layer, it is possible to use a resin which swells according to absorption of an electrolyte solution. Specific examples thereof include a vinyl resin, a urethane resin, a polyester resin, a polyamide resin, an epoxy resin, a polyimide resin, a silicone resin, a phenol resin, a melamine resin, a urea resin, an aniline resin, an ionomer resin, and polycarbonate. Among them, a vinyl resin, a urethane resin, a polyester resin, and a polyamide resin are preferable.

The conductive aid is selected from materials having electric conductivity.

Specific examples thereof include a metal [aluminum, stainless (SUS), silver, gold, copper, and titanium], carbon [graphite and carbon black (acetylene black, ketjen black, furnace black, channel black, heat transfer lamp black, carbon nanotube (monolayer carbon nanotube and multi-layer carbon nanotube), carbon nanohorn, carbon nanobaloon, hard carbon, and fullerene], and a mixture thereof, but it is not limited to them.

The conductive aid may be used either singly or in combination of two or more types. Furthermore, an alloy or a metal oxide of them can be also used. From the viewpoint of electrical stability, it is preferably aluminum, stainless, carbon, silver, gold, copper, titanium or a mixture thereof. More preferably, it is silver, gold, aluminum, stainless, or carbon. Even more preferably, it is carbon. Furthermore, as a conductive aid, a non-electrically conductive material like particle based ceramic material and resin material which is coated with an electrically conductive material (the metal among the above conductive aid materials) by plating or the like, and a mixture of a non-electrically conductive material and an electrically conductive material (the metal among the above conductive aid materials) can be also used.

Shape of the conductive aid is not particularly limited, and those having a shape like globule shape, amorphous shape, fiber shape, single particle shape, aggregate shape, or a combination thereof can be used. In particular, from the electric conductivity or the like, it is preferably an aggregate of microparticle of which primary particle diameter is 5 to 50 nm. The shape of the conductive acid can be identified by measuring, using a scanning type electron microscope or the like, particles in a viewing field according to observation of an enlarged image of a conductive aid.

It is also possible to use electrically conductive fiber as a conductive aid. Examples of the electrically conductive fiber include carbon fiber such as PAN based carbon fiber or pitch based carbon fiber, electrically conductive fiber obtained by homogeneously dispersing a metal with good electric conductivity or graphite in synthetic fiber, metal fiber in which metal like stainless steel is formed into fiber, electrically conductive fiber obtained by coating a surface of organic fiber with metal, and electrically conductive fiber obtained by coating a surface of organic fiber with a resin containing an electrically conductive material.

Among those electrically conductive fibers, the carbon fiber is preferable.

The coated active material particle can be obtained as follows: in a state in which an active material particle is added to an universal mixer and stirred at 30 to 500 rpm, for example, a resin solution, in which a resin for coating and a conductive aid which is used as necessary are dissolved and mixed in an organic solvent, added dropwise over 1 to 90 minutes for mixing, followed by further mixing a conductive aid which is used as necessary, increasing the temperature to 50 to 200° C. in a stirring state, lowering the pressure to 0.007 to 0.04 MPa, and maintaining it for 10 to 150 minutes.

Ratio of the resin for coating which is contained in the resin solution is preferably 10 to 50% by weight based on the weight of the resin solution. As for the organic solvent used for the resin solution, an organic solvent capable of dissolving the resin for coating can be used.

Obtainment of the coated active material particle can be confirmed by observing an enlarged image of the coated active material particle which is obtained by using a scanning electron microscope or the like. It is preferred that at least part of the surface of the active material particle is adhered with the resin for coating.

Each of the positive electrode composition and negative electrode composition to be filled in the positive electrode chamber 2 and the negative electrode chamber 3 is preferably composed of an active material particle and an electrolyte solution, for the reason of forming a favorable active material layer. When an active material particle and electrolyte solution are contained, weight of the positive electrode active material particle or negative electrode active material particle to be contained in the positive electrode composition and the negative electrode composition, respectively, is 10 to 60% by weight based on the weight of the electrolyte solution.

As for the electrolyte solution, an electrolyte solution containing an electrolyte and a non-aqueous solution used for production of a lithium ion cell can be used.

As for the electrolyte, those commonly used for an electrolyte solution can be used. Examples thereof include a lithium salt of an inorganic acid such as $LiPF_6$, $LiBF_4$, $LiSbF_6$, $LiAsF_6$ or $LiClO_4$ and a lithium salt of an organic acid such as $LiN(CF_3SO_2)_2$, $LiN(C_2F_5SO_2)_2$ or $LiC(CF_3SO_2)_3$. The electrolyte may be used either singly or in combination of two or more types. In particular, $LiPF_6$ is preferable from the viewpoint of battery output and charge and discharge cycle characteristics.

As for the non-aqueous solvent, those commonly used for an electrolyte solution can be used. For example, lactone, cyclic or chain type carbonate ester, chain type carboxylic acid ester, cyclic or chain type ether, phosphoric acid ester, nitrile compound, amide compound, sulfone, sulfolane, and a mixture thereof can be used. The non-aqueous solvent may be used either singly or in combination of two or more types.

From the viewpoint of the cell output and charge and discharge cycle characteristics, those preferred among the above non-aqueous solvents are a lactone compound, cyclic type carbonate ester, chain type carbonate ester, and phosphoric acid ester. More preferred is a mixture of lactone compound, cyclic type carbonate ester, and chain type carbonate ester. Even more preferred is a mixture of cyclic type carbonate ester and chain type carbonate ester. Particularly preferred is a mixture of propylene carbonate (PC) or ethylene carbonate (EC) with diethyl carbonate (DEC).

Concentration of the electrolyte contained in the electrolyte solution is preferably 0.1 to 3 mol/L, and more preferably 0.5 to 2 mol/L based on the volume of the electrolyte solution.

In the present invention, from the viewpoint of reducing the ion resistance or the like, each of the positive electrode active material layer 5 and the negative electrode active material layer 6 preferably contains the aforementioned coated active material particle and a fibrous electrically conductive filler. Examples of the fibrous electrically conductive filler include carbon fiber such as PAN based carbon fiber or pitch based carbon fiber, electrically conductive fiber obtained by dispersing evenly a metal with good electric conductivity or graphite in synthetic fiber, metal fiber in which metal like stainless steel is formed into fiber, electrically conductive fiber obtained by coating a surface of organic fiber with metal, and electrically conductive fiber obtained by coating a surface of organic fiber with a resin containing an electrically conductive material. Among those electrically conductive fibers, the carbon fiber is preferable.

From the viewpoint of the ion resistance and strength of an active material layer or the like, average fiber length of the fibrous electrically conductive filler preferably 100 to 1000 μm. It is more preferably 110 μm to 600 μm and particularly preferably 150 μm to 500 μm. The mean fiber diameter is preferably 0.1 to 100 μm, and more preferably 0.5 to 2.0 μm.

When a fibrous electrically conductive filler is contained in the positive electrode active material layer 5 and the negative electrode active material layer 6, ratio of the fibrous electrically conductive filler is, based on the weight of the coated active material particle contained in an active material layer, preferably 0.5 to 5% by weight.

When a fibrous electrically conductive filler is contained in the positive electrode active material layer 5 and the negative electrode active material layer 6, a positive electrode active material layer and a negative electrode layer can be formed by filling each of the positive electrode chamber 2 and the negative electrode chamber 3 with a positive electrode composition which contains the positive electrode active material particle, a fibrous electrically conductive filler, and an electrolyte solution, and a negative electrode composition which contains the negative electrode active material particle, a fibrous electrically conductive filler, and an electrolyte solution, respectively.

As the separator 4, a porous film of hydrocarbon resin like polyfluorovylydene-hexafluoropropylene (PVdF-HFP) and polyolefin (polyethylene and polypropylene), a lamiate film of porous film (for example, a laminate with three-layer structure of PP/PE/PP), a non-woven fabric composed of synthetic fiber (polyester fiber and aramid fiber) and glass fiber, and a known separator for a lithium ion cell having ceramic particles such as silica, alumina, titania or the like adhered on a surface of them can be used.

Thickness of the separator 4 can be adjusted depending on the use of a lithium ion cell. However, for a use in an electronic device such as a portable device, it is preferably 5 to 100 μm in a monolayer or a multilayer. More preferably, it is 10 to 50 μm.

The pore diameter of the separator 4 composed of a porous film or a multilayer film thereof is preferably 1 μm at most (in general, it is a pore diameter with several tens of nm). When a non-woven fabric is used, thickness of the separator 4 is preferably 5 to 200 μm, and particularly preferably 10 to 100 μm.

The positive electrode current collector 7 and the negative electrode current collector 8 are a current collector composed of an electrically conductive polymer composition (also referred to as a resin current collector). The polymer material for forming the resin current collector may be an electrically conductive polymer or a polymer composition containing a polymer material which has no intrinsic electric conductivity but provided with electric conductivity.

Examples of the electrically conductive polymer material include polyaniline, polypyrrole, polythiophene, polyacetylene, polyparaphenylene, polyphenylene vinylene, polyacrylonitrile, and polyoxadiazole. Furthermore, for the purpose of improving electric conductivity of a resin current collector containing an electrically conductive polymer material, the below-mentioned electrically conductive filler may be further contained.

Examples of the polymer material having no electric conductivity include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SER), polyacrylonitrile (PAN), polymethyl acrylate (PMA), polymethyl methacrylate (PMMA), polyvinylidene fluoride (PVdF), an epoxy resin, a silicone resin, and a mixture thereof.

As for the polymer material having no electric conductivity, polyethylene (PE), polypropylene (PP), polymethylpentene (PMP), and polycycloolefin (PCO) are preferable from the viewpoint of the electric stability. More preferably, it is polyethylene (PE), polypropylene (PP), or polymethylpentene (PMP).

A polymer composition containing a polymer material which has no intrinsic electric conductivity but been provided with electric conductivity can be obtained by mixing a polymer material having no intrinsic electric conductivity with an electrically conductive filler. The electrically conductive filler is selected from a filler which is obtained from a material with electric conductivity. Preferably, from the viewpoint of inhibiting ion penetration in a current collector, a filler obtained from a material having no conductivity for ion which is used as a charge transfer medium can be used. Examples of a material having no conductivity for ion include a carbon material, aluminum, gold, silver, copper, iron, platinum, chrome, tin, indium, antimony, titanium, nickel, and an alloy material like stainless (SUS), but not limited thereto. In particular, from the viewpoint of corrosion resistance, a filler obtained from aluminum, stainless, a carbon material, or nickel is preferable. More preferably, it is a filler obtained from a carbon material. The electrically conductive filler may be used either singly or in combination of two or more types. Shape of the electrically conductive filler can be any one of particle shape, fiber shape, and an aggregate thereof. The electrically conductive filler may be those obtained by coating a periphery of microparticles having no electric conductivity like particle based ceramic material or resin material with the aforementioned metal by plating or the like.

The resin current collector can be obtained by a known method like those described in JP 2012-150905 A and WO 2015/005116 A. Specifically, those provided with electric conductivity by dispersing 5 to 30 parts of acetylene black as an electrically conductive filler in polypropylene can be mentioned. Thickness of the resin current collector is not particularly limited, either. It can be the thickness already known in the art or can be applied after suitable modification.

To increase the current drawing efficiency from the resin current collector, an electrically conductive layer may be formed between the divided container and current collector. As for the electrically conductive layer, a material having higher electric conductivity in plane direction than the resin current collector can be used without any limitation. As for the material having high electric conductivity in plane direction, at least one metal selected from a group consisting of copper, aluminum, titanium, nickel, tantalum, niobium, hafnium, zirconium, zinc, tungsten, bismuth, and antimony, and an alloy containing at least one of them, and a stainless alloy can be used. In particular, copper, nickel, aluminum and titanium can be preferably used. As an electrically conductive layer, a foil or a film consisting of those metals can be used, and a film can be formed between the divided container and current collector by sputtering or vapor deposition under known conditions.

The resin current collector is disposed on the inner side of the outer container 20. However, from the viewpoint of the durability or the like, it is preferable that the resin collector is integrally formed with the outer container 20. Integral forming can be performed by a method of forming a current collector according to molten molding of an electrically conductive polymer composition with use of a molding die on the inner side of the outer container 20 as a resin molded article.

The first divided container 20a and the second divided container 20b may be integrally sealed by using a sealing member. The sealing member is not particularly limited as long as it is a material having adhesive property for the positive electrode current collector 7 and the negative electrode current collector 8 and also having durability against an electrolyte solution, and a known sealant for a lithium ion cell can be used. In particular, a sealant containing thermosetting resin as a main component is preferable. Examples of the sealing member include a sealant which contains, as a main component, an epoxy resin, a polyolefin resin, a polyurethane resin, or a polyvinylidene fluoride resin, and from the viewpoint of having high durability and easy handling, a sealant containing an epoxy resin as a main component is preferable.

As for the sealing member, those with double-sided tape shape with coating of plane-shaped surfaces with the aforementioned thermosetting resin in which a sealant and a known sealing film or the like are used are preferable. As for the sealing film, a sealing film with three-layer structure (a film obtained by laminating a modified polypropylene film on top and bottom of a polyethylene naphthalate film) can be preferably used. By heating and compressing a sealing member using a known sealing device like impulse sealer, a container can be sealed.

The container 20 (the first divided container 20a and the second divided container 20b) is composed of a resin molded article, and the resin molded article can be obtained by molding an organic polymer by using a known molding machine.

As for the organic polymer, any organic polymer can be suitably applied as long as it is an organic polymer which can create a space for accommodating the positive electrode active material layer 5 and the negative electrode active material layer 6 within the container 20. However, considering the possibility of having a contact between the electrode composition and the container 20, the material for constituting the container 20 is preferably an organic polymer with insulating property.

Examples of the organic polymer used for the resin molded article include the polymer material having no electric conductivity described above, acrylonitrile butadiene styrene resin (ABS), polycarbonate resin (PC), polyphthalamide resin (PPA), polyphthalamide resin, and polybutylene terephthalate (PBT).

The container 20 as a resin molded article preferably has a metal layer either inside or outside of a resin molded article. When a metal layer is included in the inside or outside of a resin molded article, water absorption by a power generation part disposed in the inside of a container can be prevented and a decrease in the charge and discharge characteristics can be prevented, and therefore desirable. When a metal layer is included in the inside or outside of a resin molded article, the metal layer is preferably disposed on the entire side of a resin molded article. As for the material for forming the metal layer, at least one metal selected from a group consisting of copper, aluminum, titanium, nickel, tantalum, niobium, hafnium, zirconium, zinc, tungsten, bismuth, and antimony, and an alloy containing at least one of them, and a stainless alloy can be used. In particular, aluminum can be preferably used. The metal layer can be formed by a method of applying a foil or a film consisting of those metals in the inside or outside of a resin molded article or by a method of forming a thin film consisting of those metals in the inside or outside of a resin molded article by sputtering and vapor deposition.

The resin molded article can be obtained by a known molding method such as a method of adding a heated and molten organic polymer to a molding die followed by molding or a method of adding a film composed of an organic polymer to a molding die followed by molding. When the resin molded article has a metal layer on the outside of the article, a metal layer can be formed by a method of laminating a metal foil or a metal film on the outside of a resin molded article after molding, a method of integrally molding, within a molding die, a metal foil or a metal film on the outside of a resin molded article (insert molding), or a method of forming a metal thin film on the outside of a resin molded article by sputtering and vapor deposition. When the resin molded article has a metal layer in the inside of the article, the metal layer can be formed by a method in which a metal layer is formed by adding, within a molding die, a metal foil on the inner surface of the resin molded article followed by performing molding after adding the heated and molten organic polymer on top of the metal layer. When the resin molded articles has a metal layer in the inside of the article, the resin molded article may be a molded article which is obtained by adding a polymer film, in which top and bottom of a metal layer are sandwiched with a polymer material, to a molding die followed by molding.

Figure 3:
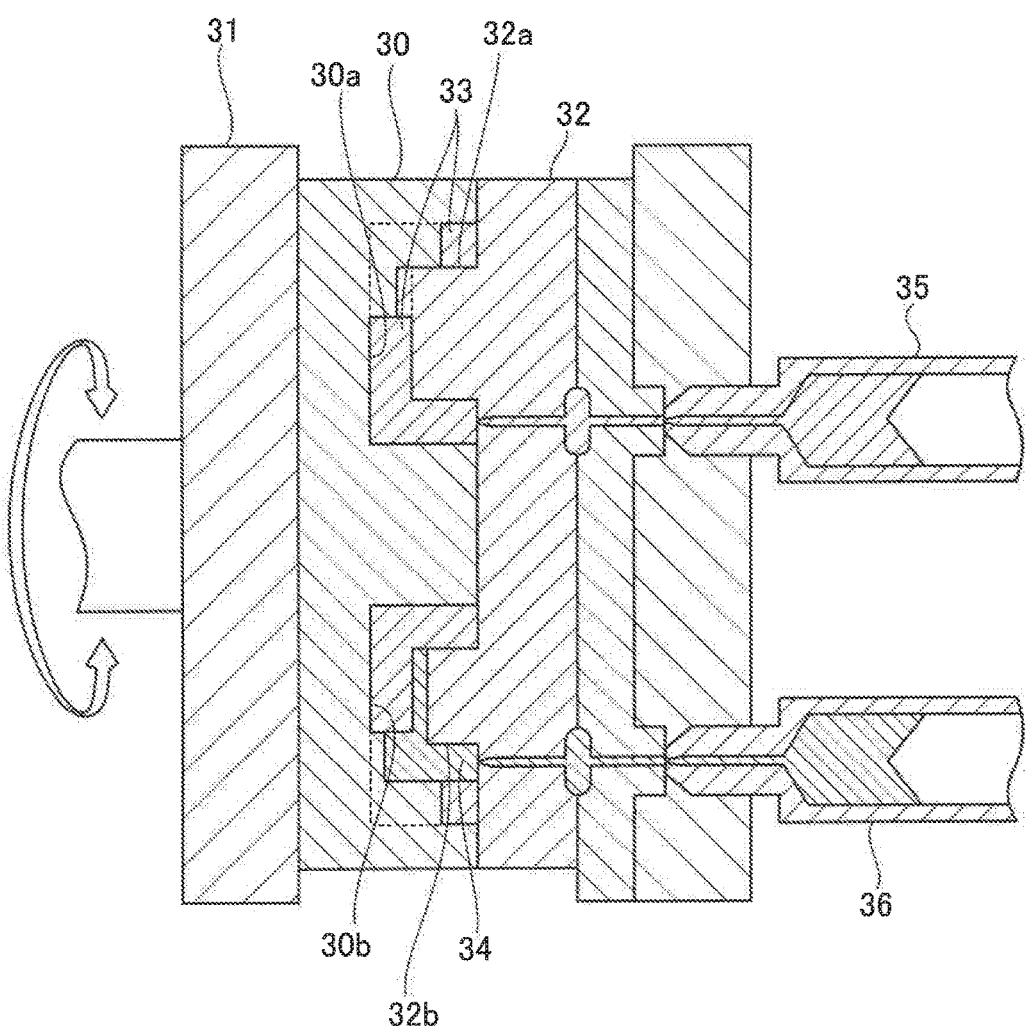
FIG. 3 is a cross-sectional view illustrating a process performed according to the method for producing a lithium ion cell according to the first embodiment of the present invention.

Next, referring to FIG. 3 and FIG. 4, a production method of lithium ion cell according to the present invention is described. FIG. 3 is a cross-sectional view illustrating one process of a production method of lithium ion cell according to the first embodiment of the present invention. FIGS. 4A to 4G are drawings illustrating processes of the production method of lithium ion cell according to the first embodiment.

First, a current collector forming process is performed. Here, a first divided container 20a and a second divided container 20b are formed by molding an organic polymer by using forming molds. Subsequently, a positive electrode current collector 7 and a negative electrode current collector 8 are respectively molded inside the first divided container 20a and the second divided container 20b, which are formed by molding, by using forming molds.

The current collector forming process and the molding of the first divided container 20a and the second divided container 20b may be performed successively, or the current collector forming process may be performed on a pre-molded first divided container 20a and a pre-molded second divided container 20b.

In the production method of the present invention, when the current collector forming process and the molding of containers are performed in succession, the two-color injection molding process illustrated in FIG. 3 enables successive molding of the positive electrode current collector 7 and the negative electrode current collector 8 and the first divided container 20a and the second divided container 20b.

In FIG. 3, reference numeral 30 denotes a first mold having two or more depression parts 30a and 30b (two in the example illustrated in the figure) corresponding to the shape of an outer surface of the first divided container 20a or the second divided container 20b. This first mold 30 is fixed on a rotatable turntable 31. Reference numeral 32 denotes a second mold having a first protrusion part 32a and a second protrusion part 32b. The first protrusion part 32a corresponds to the shape of an inner surface of the first divided container 20a or the second divided container 20b. The second protrusion part 32b corresponds to the shape of an inner surface of the positive electrode current collector 7 or the negative electrode current collector 8.

Accordingly, a gap 33 matching the first divided container 20a or the second divided container 20b is formed between the depression part 30a and the first protrusion part 32a. A gap 34 is formed between the depression part 30b and the second protrusion part 32b. The gap 34 matches the first divided container 20a or the second divided container 20b and the positive electrode current collector 7 or the negative electrode current collector 8. The positive electrode current collector 7 or the negative electrode current collector 8 is molded by using the gap 34 in which the first divided container 20a or the second divided container 20b has been disposed.

In FIG. 3, an injector 35 is provided so as to be in communication with the gap 33. The injector 35 holds an organic polymer, which forms the first divided container 20a or the second divided container 20b, in fluidized state by melting it by heating and the like. An injector 36 is provided so as to be in communication with the gap 34. The injector 36 holds an electrically conductive polymer composite, which forms the positive electrode current collector 7 or the negative electrode current collector 8, in fluidized state by melting it by heating and the like.

When a process of outer container molding is performed, the organic polymer in fluidized state is injected from the injector 35 into the molds that are kept at a temperature lower than the melting temperature of the organic polymer. As a result, the organic polymer is solidified inside the gap 33, and the first divided container 20a or the second divided container 20b having the shape that matches the gap 33 is molded. Subsequently, the turntable 31 is rotated, and the depression part in which the first divided container 20a or the second divided container 20b has been molded is combined with the second protrusion part 32b. Next, the current collector forming process is performed in which the electrically conductive polymer material in fluidized state is injected from the injector 36 into the gap 34. Here, the first divided container 20a or the second divided container 20b has been already molded in the gap 34. Thus, the positive electrode current collector 7 or the negative electrode current collector 8 is integrally molded together with the first divided container 20a or the second divided container 20b within the gap 34.

In FIG. 3, the process of outer container molding and the current collector forming process can be continuously performed by successively performing the process of outer container molding and the current collector forming process while turning the turntable 3:1 by 180 degrees with respect to the two depression parts 30a.

Alternatively, after the molding of the first divided container 20a and the second divided container 20b, but before the forming process of the positive electrode current collector 7 or the negative electrode current collector 8, an electrically conductive layer such as a metal foil and the like may be disposed on inner surfaces of the first divided container 20a and the second divided container 20b. In the case that an electrically conductive layer is disposed on the inner surfaces of the first divided container 20a and the second divided container 20b, of surfaces of the first divided container 20a and the second divided container 20b, a surface on which the positive electrode current collector 7 or the negative electrode current collector 8 is to be molded is exposed after the molding of the first divided container 20a and the second divided container 20b. After a metal layer is formed on the exposed surface, the first divided container 20a and the second divided container 20b are put back to the mold, and the forming of the positive electrode current collector 7 or the negative electrode current collector 8 is performed. This enables the provision of the electrically conductive layer.

Figure 4A:
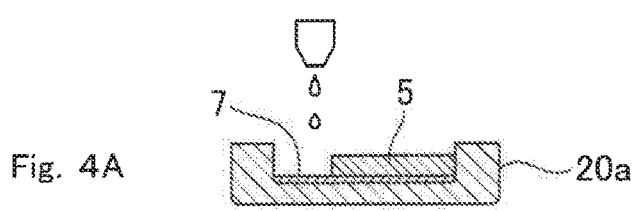
FIGS. 4A to 4G are drawings illustrating the process of the method for producing a lithium ion cell according to the first embodiment of the present invention.

Next, an electrode slurry filling process is performed. In this process, as illustrated in FIGS. 4A and 4D, the first divided container 20a and the second divided container 20b, in which the positive electrode current collector 7 and the negative electrode current collector 8 are respectively molded on their inner surfaces, are filled with a positive electrode composition and a negative electrode composition, respectively. The method of filling the first divided container 20a and the second divided container 20b with the positive electrode composition and the negative electrode composition respectively is not limited to any particular method. Suitable methods include, for example, well-known methods such as a method of filling the positive electrode composition and the negative electrode composition from their storage tanks through nozzles, a method of filling the first divided container 20a and the second divided container 20b with the positive electrode composition and the negative electrode composition by using an inkjet device, and the like.

The amounts of the positive electrode composition and the negative electrode composition to be used for filling the first divided container 20a and the second divided container 20b, in which the positive electrode current collector 7 and the negative electrode current collector 8 are respectively molded on their inner surfaces, are at least equal to amounts needed to completely fill the depression parts of the first divided container 20a and the second divided container 20b with the positive electrode composition and the negative electrode composition, respectively.

Preferably, the amounts are such that the positive electrode composition and the negative electrode composition fill up the depression parts so as to form slightly raised surfaces therefrom.

Figure 4B:
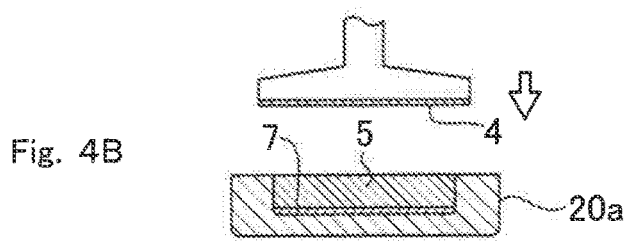
Figure 4C:
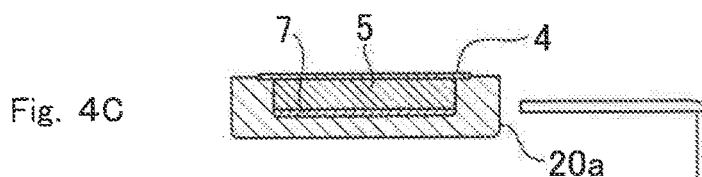
Figure 4D:
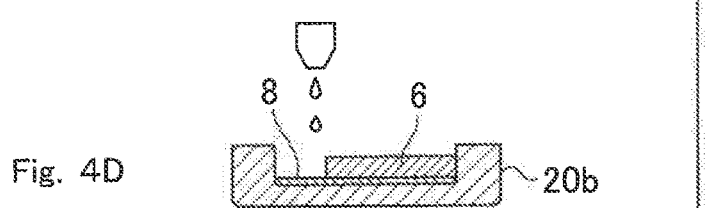

Next, as illustrated in FIG. 4B, a plate-like separator 4 is positioned above a top surface of one of the first divided container 20a and the second divided container 20b (the first divided container 20a in the example illustrated in the figure), which is filled with the positive electrode composition or the negative electrode composition. Subsequently, as illustrated in FIG. 4C, the separator 4 covers a top surface of one of the positive electrode composition and the negative electrode composition (the positive electrode composition in the example illustrated in the figure). In the case that, as described above, the positive electrode composition and the negative electrode composition respectively fill up the depression parts of the first divided container 20a and the second divided container 20b in such a manner as to form slightly raised surfaces above the depression parts, it is preferred to have an even thickness in the positive electrode composition or the negative electrode composition. This may be achieved by using a roller to press down a top surface of the separator 4 when the separator 4 is being arranged.

Figure 4E:
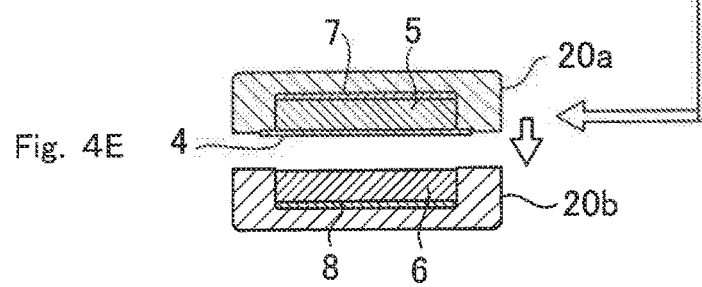
Figure 4F:
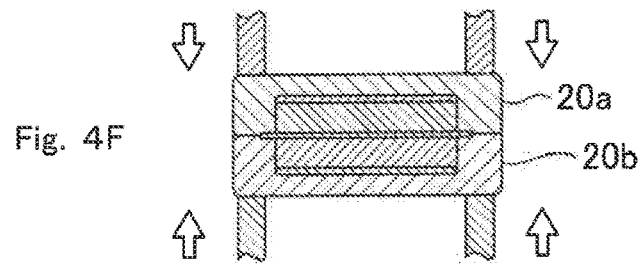
Figure 4G:
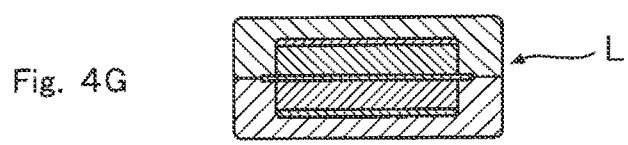

Next, as illustrated in FIG. 4E, one of the first divided container 20a and the second divided container 20b (the first divided container 20a in the example illustrated in the figure) is turned upside down and arranged in such a way that the first divided container 20a and the second divided container 20b face each other. Furthermore, it is preferred to de-aerate the first divided container 20a and the second divided container 20b. Subsequently, as illustrated in FIG. 4F, the first divided container 20a and the second divided container 20b are directly welded and sealed by ultrasonic welding and the like, or by performing a joining process to form an integrated unit, in which sealing is achieved by a sealing material. In this way, the lithium ion cell L, such as ones illustrated in FIG. 1 and FIG. 4G, is obtained.

According to the lithium ion cell L produced by the foregoing production method of the present invention, the lithium ion cell L having both large capacity and lighter weight is provided because the outer container 20 composed of resin molded bodies, in which resin current collectors are molded, is utilized. Furthermore, this enables the production of lithium ion cell utilizing a well-known molding technique such as an injection molding and the like with simpler processes and higher productivity, compared with prior art production methods. In addition, the positive electrode current collector 7 and the negative electrode current collector 8 are integrally molded together with the outer container 20. Thus, strength of the positive electrode current collector 7 and the negative electrode current collector 8 is improved, thereby making it possible to improve durability of lithium ion cell. Furthermore, in the case that the first divided container 20a, the second divided container 20b, the positive electrode current collector 7, and the negative electrode current collector 8 are molded by multi-color injection molding technology such as two-color molding and the like, the molding process and the forming process is simplified, and the productivity is improved.

Figure 5:
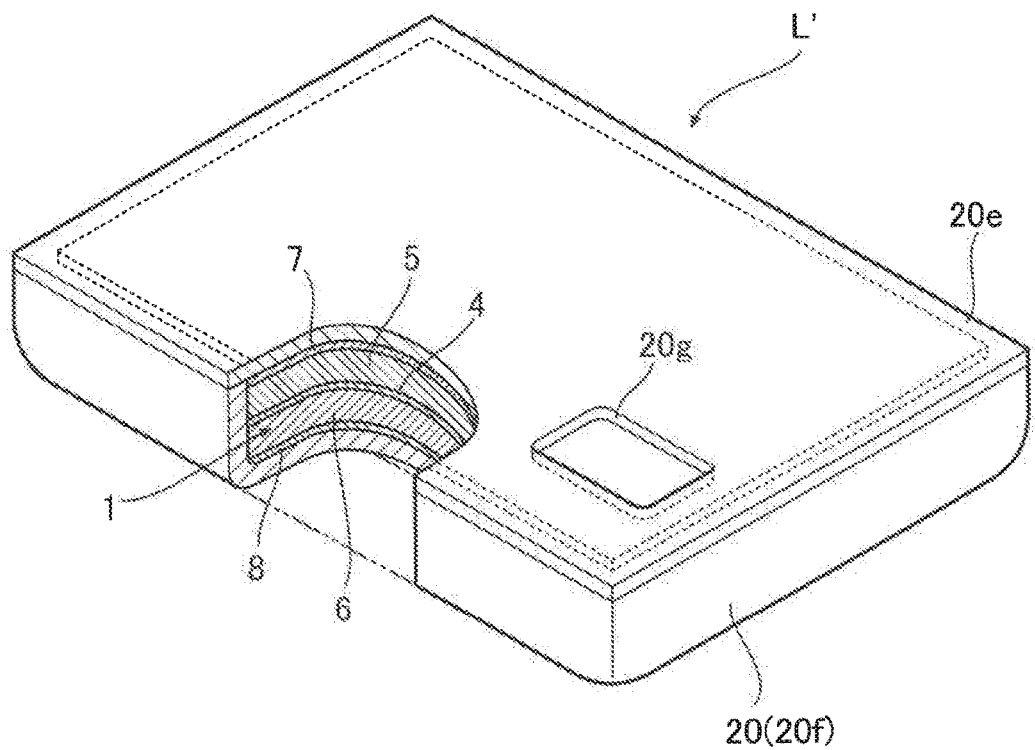
FIG. 5 is a partial cutaway perspective view illustrating, among the lithium ion cells produced by the production method of the present invention, a lithium ion cell according to a second embodiment.

Next, referring to FIG. 5, a lithium ion cell L' of the second embodiment, which is produced by the production method of the present invention, is described. FIG. 5 is a partial cutaway perspective view illustrating a lithium ion cell L' of the second embodiment, which is produced by the production method of the present invention. Furthermore, for the following descriptions, the constitutional elements similar to those of the lithium ion cell L of the aforementioned first embodiment of the present invention are given with the same symbols, and the descriptions are omitted therefor.

The biggest difference between the lithium ion cell L of the first embodiment and the lithium ion cell L' of the second embodiment lies in the shape of a divided container. Namely, as illustrated in FIG. 5, the container 20 of the lithium ion cell L' is a hollow member with an approximately rectangular-parallelepiped shape which consists of the second divided container 20f with removed top surface as illustrated in FIG. 5 and the first divided container 20e with flat plate shape for covering the top surface of the second divided container 20f.

Furthermore, as illustrated in FIG. 5 and FIGS. 6A to 6F, in part of the first divided container 20e and the second divided container 20f, the cutout part 20g and 20h (in FIG. 5, only the cutout part 20g is illustrated in the drawing) are formed, and through the cutout part 20g and 20h, the power generation part 1 is exposed to the outside.

Next, the method for producing the lithium ion cell L' of the second embodiment, which is also the production method of the present invention, is described with reference to FIGS. 6A to 6F. FIGS. 6A to 6F are drawings illustrating the process of a method for producing the lithium ion cell L' of the second embodiment.

First, by using a mold, the first divided container 20e and the second divided container 20f are molded. Then, a current collector forming process by which the positive electrode current collector 7 and the negative electrode current collector 8 are formed, using similarly a mold, on the inner side of the molded first divided container 20e and second divided container 20f is performed. Since details of the molding process are almost the same as the molding process of the lithium ion cell L of the first embodiment described above, no further descriptions are given herein.

Figure 6:
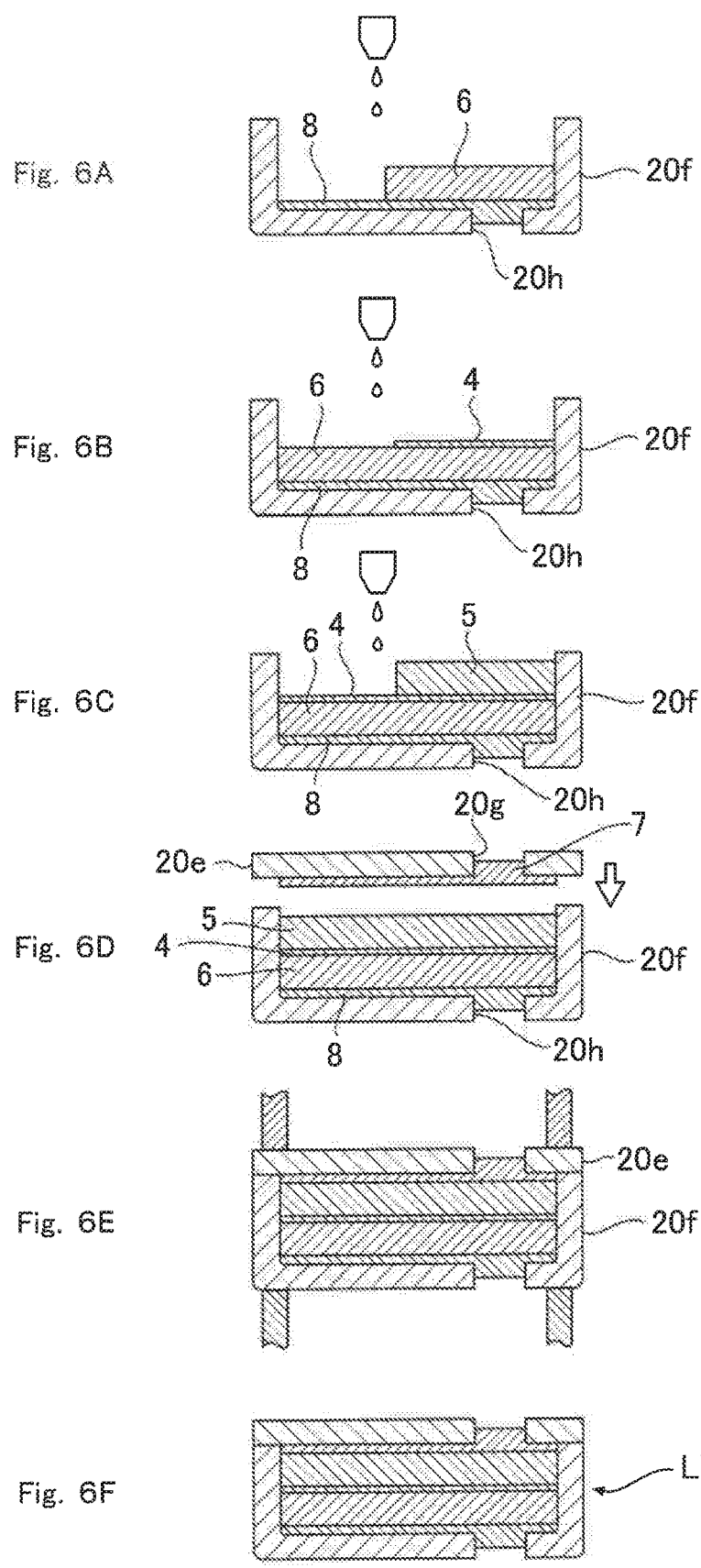
FIGS. 6A to 6F are drawings illustrating the process of the method for producing a lithium ion cell according to the second embodiment of the present invention.

Subsequently, as illustrated in FIG. 6A, a negative electrode composition is filled in the second divided container 20f having the negative electrode current collector 8 formed inside of the container to form the negative electrode active material layer 6, Subsequently, as illustrated in FIG. 6B, the separator 4 is formed on top of the negative electrode composition and, as illustrated in FIG. 6C, an electrode composition stacking process of forming the positive electrode active material layer 5 by further filling a positive electrode composition on top of the separator 4 formed in the second divided container 20f is performed. Since the details of the method of filling the positive electrode composition and negative electrode composition in the second divided container 20f is the same as that of the method for producing the lithium ion cell L of the aforementioned first embodiment, no further descriptions are given herein.

As for the separator 4 formed on top of the negative electrode composition, the material and the forming method are not limited as long as a porous insulating layer that can insulate the positive electrode active material layer 5 and the negative electrode active material layer 6 and also can allow pass-through of an electrolyte solution can be formed. Like the method for producing the lithium ion cell L described above, a method of applying a flat plate-shaped separator 4 on top of a negative electrode composition, a method of coating a hydrocarbon resin and polyolefin, which is in a fluid state after being melt by heating or dissolved in an organic solvent, on top surface of a negative electrode composition to form a flat plate-shaped porous membrane, and a method of laminating insulating particles on top surface of a negative electrode composition to form an insulating porous layer, or the like can be applied. Furthermore, as for the insulating particle, a microparticle consisting of the aforementioned polymer material having no electric conductivity and inorganic oxide microparticle (preferably, aluminum oxide and silicon dioxide) or the like can be used.

Subsequently, as illustrated in FIG. 6D, the first divided container 20e having the positive electrode current collector 7 formed therein is disposed such that it can cover the top surface of the second divided container 20f. Then, as illustrated in FIG. 6E, the first divided container 20e and the second divided container 20f are directly fused and sealed by ultrasonic welding or the like. Alternatively, by performing an integration process of sealing using a sealing member, the lithium ion cell L' illustrated in FIG. 5 and FIG. 6F can be obtained.

Since the outer container 20 composed of the resin molded article, which is obtained by forming a resin current collector, is used in the inside of the lithium ion cell L' of the second embodiment, almost the same effect as the lithium ion cell L of the first embodiment described above can be also obtained.

Figure 7:
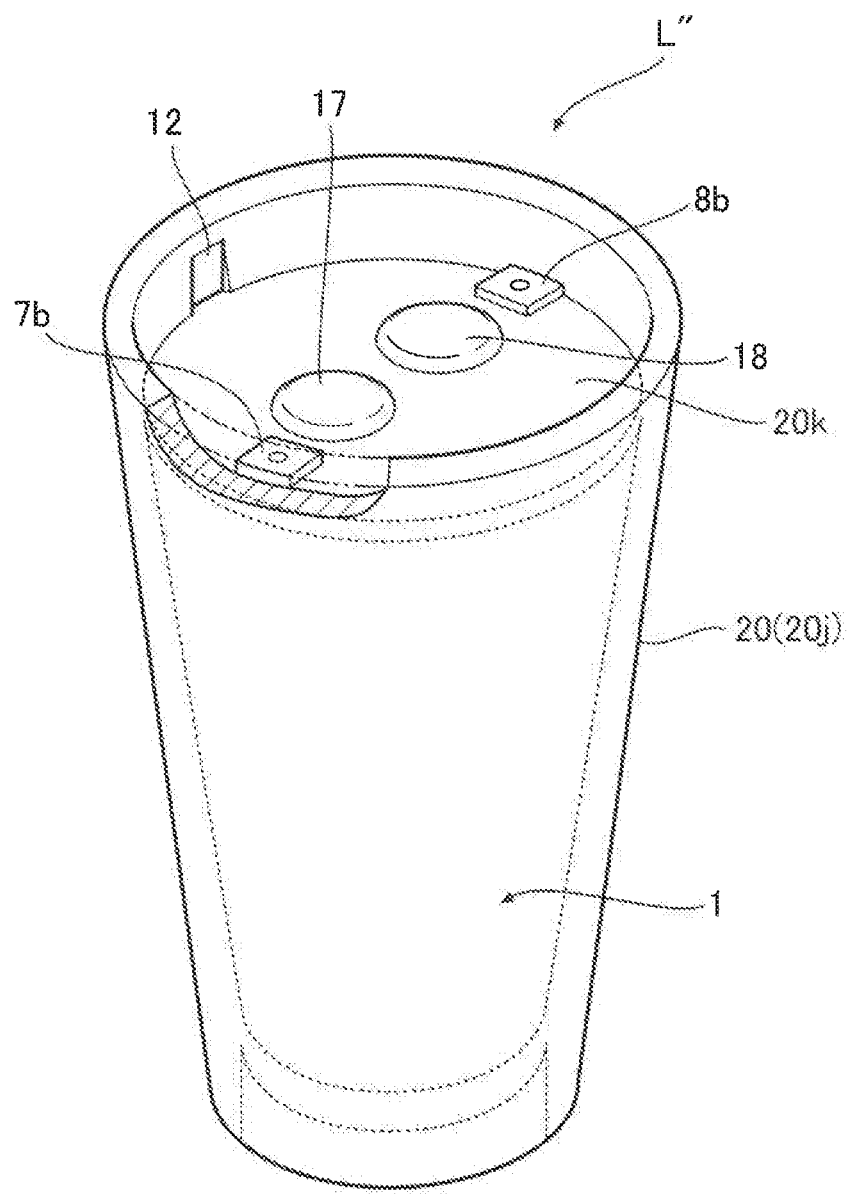
FIG. 7 is a partial cutaway perspective view illustrating, among the lithium ion cells produced by the production method of the present invention, a lithium ion cell according to a third embodiment.
Figure 8:
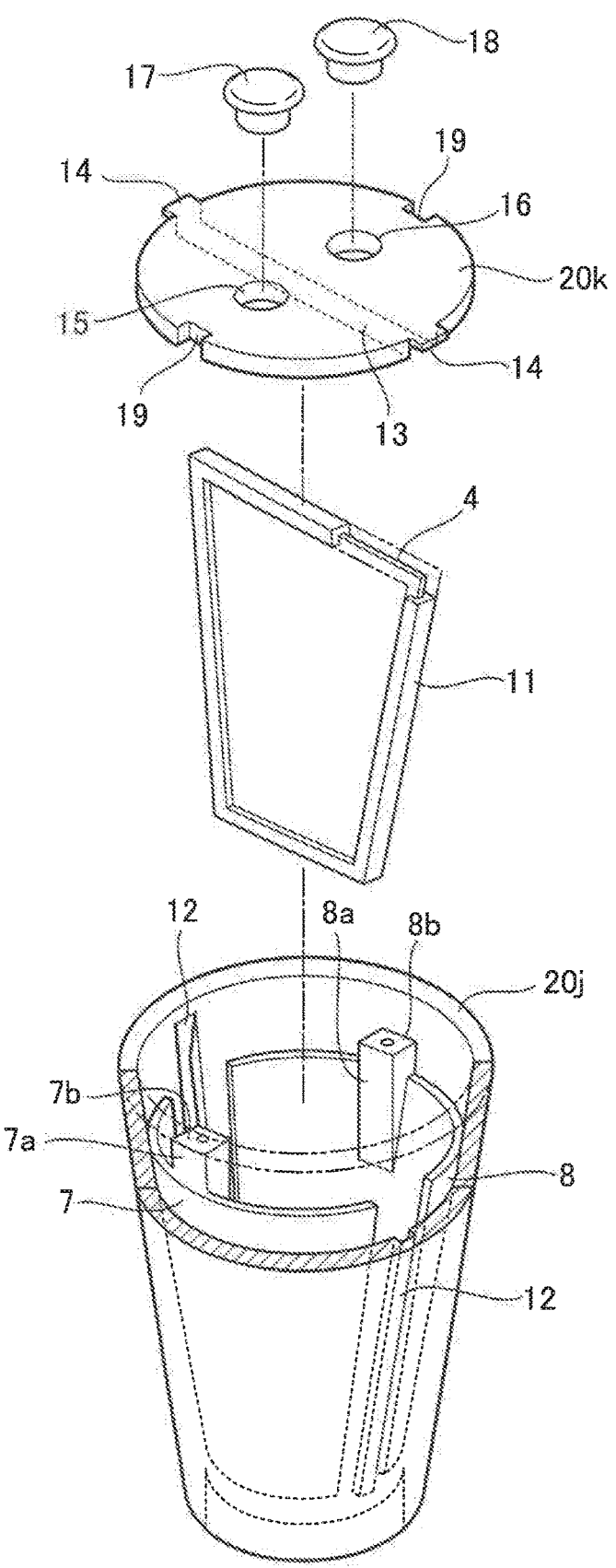
FIG. 8 is an exploded view of the lithium ion cell according to the third embodiment illustrated in FIG. 7.
Figure 9:
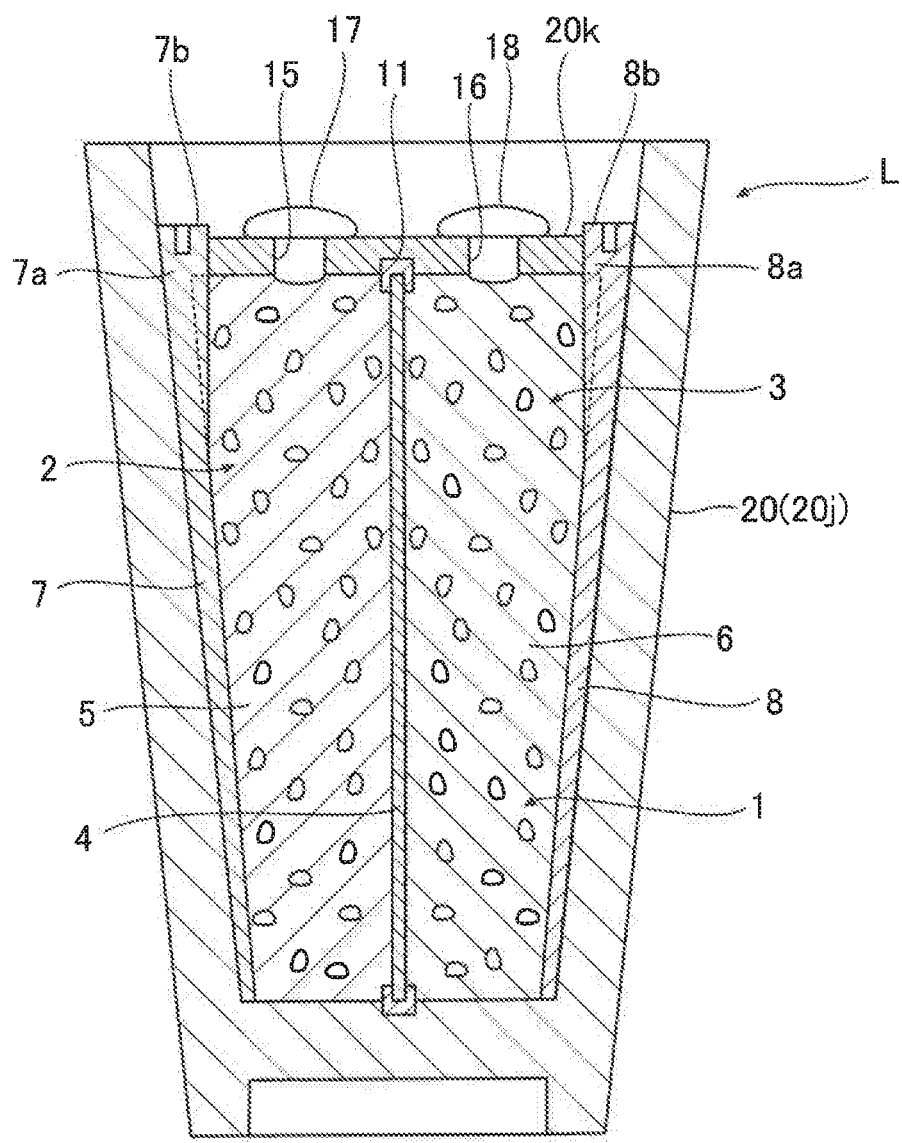
FIG. 9 is a cross-sectional view of the lithium ion cell according to the third embodiment illustrated in FIG. 7.

Next, referring to FIG. 7 to FIG. 9, a lithium ion cell L" according to the third embodiment, which is produced by the production method of the present invention, is described. FIG. 7 is a partial cutaway perspective view illustrating the lithium ion cell L" according to the third embodiment, which is produced by the production method of the present invention. FIG. 8 is an exploded view of the lithium ion cell L" according to the third embodiment illustrated in FIG. 7. FIG. 9 is a cross-sectional view of the lithium ion cell L" according to the third embodiment illustrated in FIG. 7.

As illustrated in FIG. 7 and FIG. 8, a container 20 of the lithium ion cell L" according to the third embodiment is a resin molded body and is composed of a first divided container 20j and a second divided container 20k. The first divided container 20j is molded in a hollow truncated cone shape having a base. The second divided container 20k has a substantially circular plate shape that covers an opening part of the first divided container 20j.

As illustrated in FIG. 8, a separator 4 whose circumference is supported by a frame body 11 is arranged inside the first divided container 20j. This separator 4 separates the first divided container 20j into a positive electrode chamber 2 and a negative electrode chamber 3.

Grooves 12 extending in a vertical direction are formed on inner surface of the first divided container 20j, as illustrated in FIG. 7 and FIG. 8, and a groove 13 extending a diameter direction is formed on a bottom surface of the second divided container 20k, as illustrated in FIG. 8. By fitting the frame body 11 into the grooves 12 and the groove 13, the separator 4 is fixed within a space formed by the first divided container 20j and the second divided container 20k. Furthermore, as illustrated in FIG. 8, protrusion parts 14 protruding toward the grooves 12 are formed on the second divided container 20k. This ensures airtightness of the space formed by the first divided container 20j and the second divided container 20k.

On the inner surface of the first divided container 20j, the positive electrode current collector 7 and the negative electrode current collector 8 are molded so as to face each other. The positive electrode current collector 7 and the negative electrode current collector 8 each have a substantially semicircular truncated cone shape that matches the inner surface of the first divided container 20j. Furthermore, as illustrated in FIG. 9, the positive electrode chamber 2 and the negative electrode chamber 3 are filled with the positive electrode composition and the negative electrode composition, respectively. This forms the lithium ion cell L" according to the third embodiment.

Specifically, as illustrated in FIG. 8 and FIG. 9, a through-hole 15 and a through-hole 16 respectively communicating with the positive electrode chamber 2 and the negative electrode chamber 3 are formed in the second divided container 20k. The positive electrode chamber 2 and the negative electrode chamber 3 are filled with the positive electrode composition and the negative electrode composition through the through-hole 15 and the through-hole 16, respectively. Subsequently, the positive electrode chamber 2 and the negative electrode chamber 3 are sealed by inserting a plug 17 and a plug 18 in the through-hole 15 and the through-hole 16.

As illustrated in FIG. 8, a protruded part 7a and a protruded part 8a are respectively formed at upper parts of the positive electrode current collector 7 and the negative electrode current collector 8 so as to stick out inwardly in the first divided container 20j. Top edge portions of the protruded part 7a and the protruded part 8a respectively stick out from upper edges of the positive electrode current collector 7 and the negative electrode current collector 8, and further beyond a top surface of the second divided container 20k so as to be exposed above the top surface of the second divided container 20k. A top surface 7b of the protruded part 7a and a top surface 8b of the protruded part 8a serve as electrode terminals for extracting a current from the lithium ion cell L" according to the third embodiment. In the second divided container 20k, notches 19 matching the protruded part 7a and the protruded part 8a are formed.

In the lithium ion cell L" according to the third embodiment, it is not necessary to form the second divided container 20k by resin molding such as the foregoing two-color injection molding technology or a three-color injection molding technology, which will be described later. Alternatively, the second divided container 20k may be formed of a material other than the organic polymer, and a method of forming the second divided container 20k is not limited to the method involving an injection molding technology.

Figure 13:
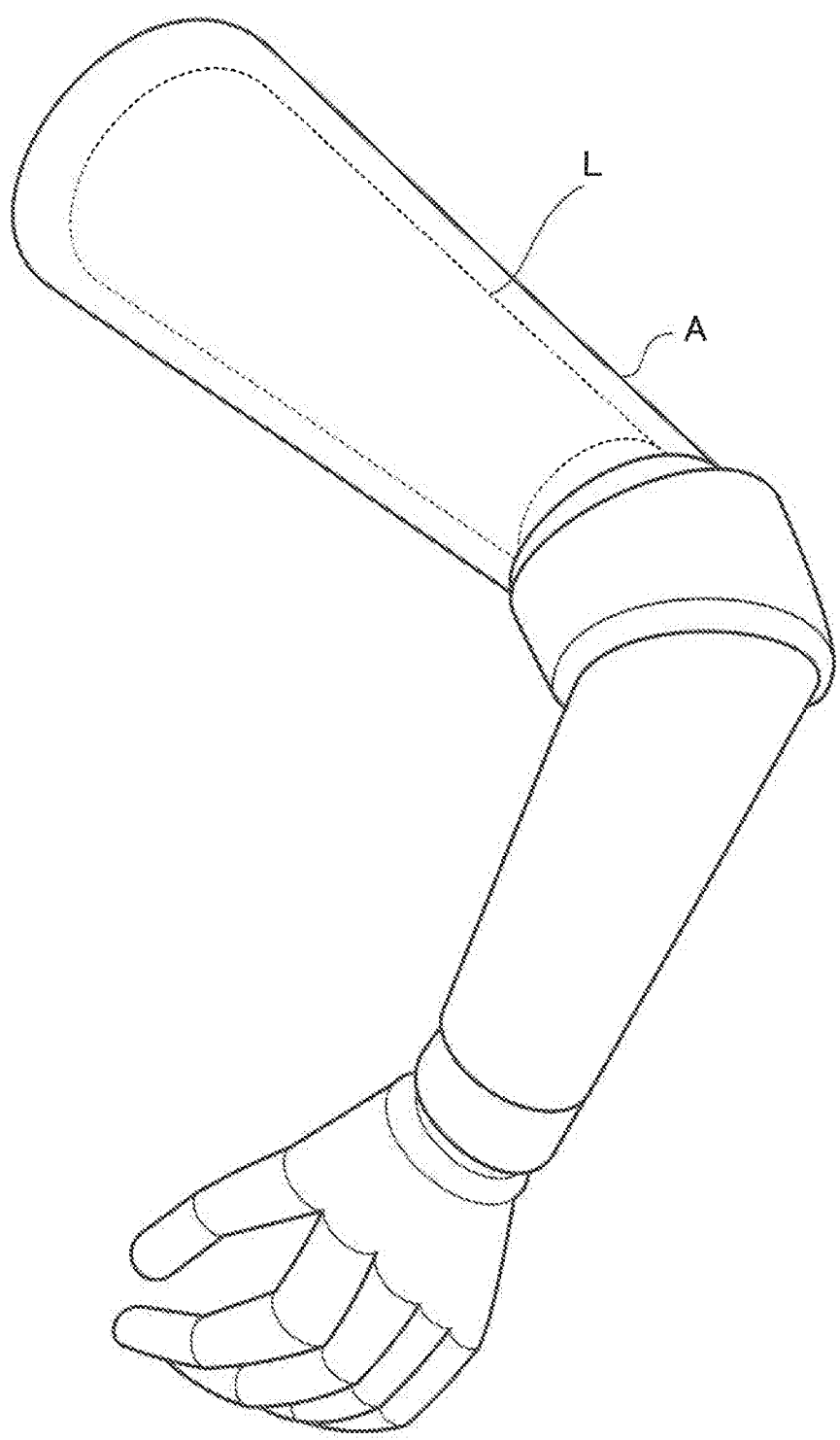
FIG. 13 is a partial perspective view illustrating a part of an exemplary robot mounted with a lithium ion cell which has been produced by the production method of the present invention.

The lithium ion cell L" according to the third embodiment may preferably be used, for example, to drive a structure such as a robot arm and the like, which has an empty space inside, as illustrated in FIG. 13. The lithium ion cell L" may be tailed inside the structure and supply a current extracted from the electrode terminal 7b and the electrode terminal 8b for driving the structure.

Figure 10:
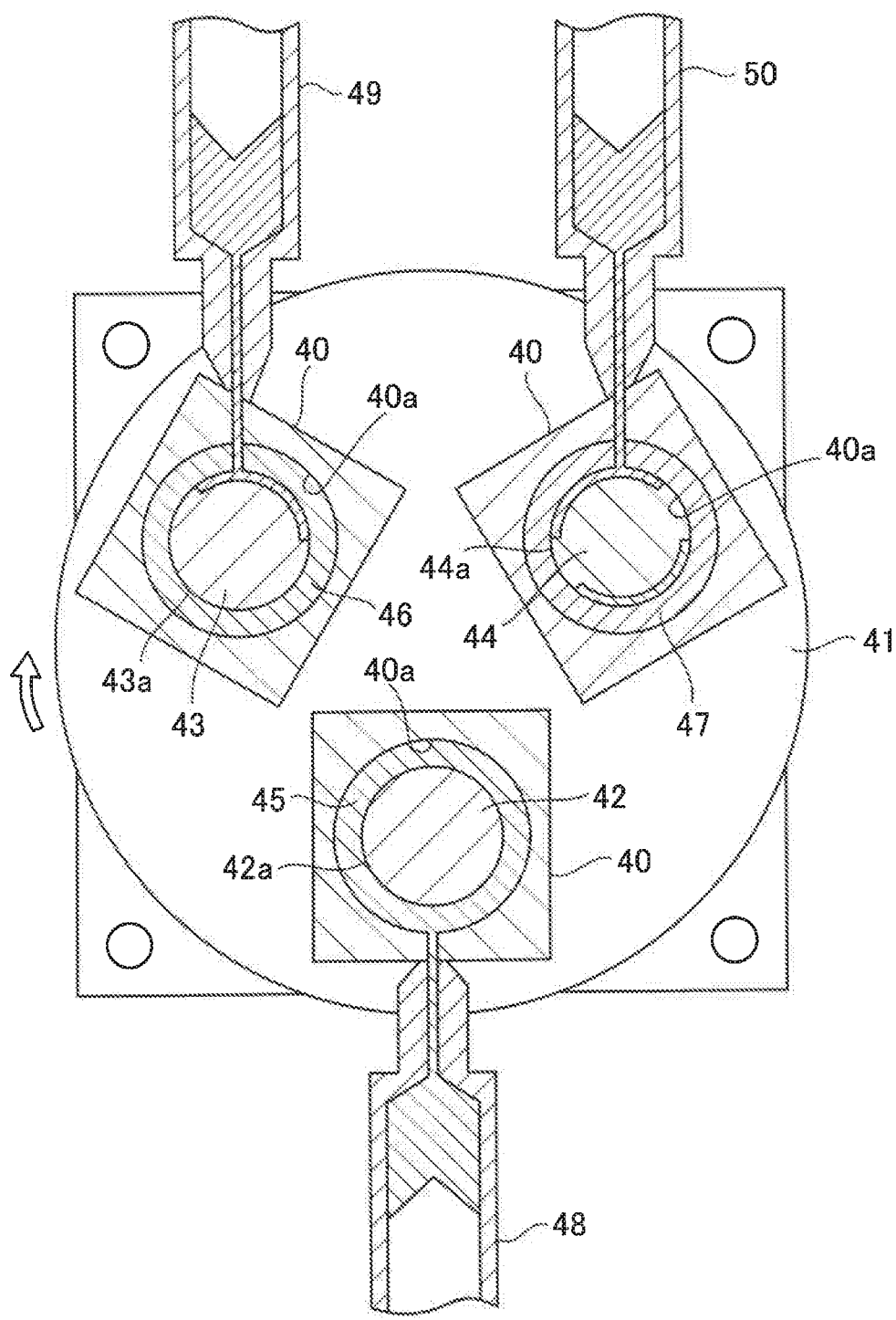
FIG. 10 is a drawing illustrating, when seen from above, a process performed for the production of a lithium ion cell according to the third embodiment based on the production method of the present invention.
Figure 11A:
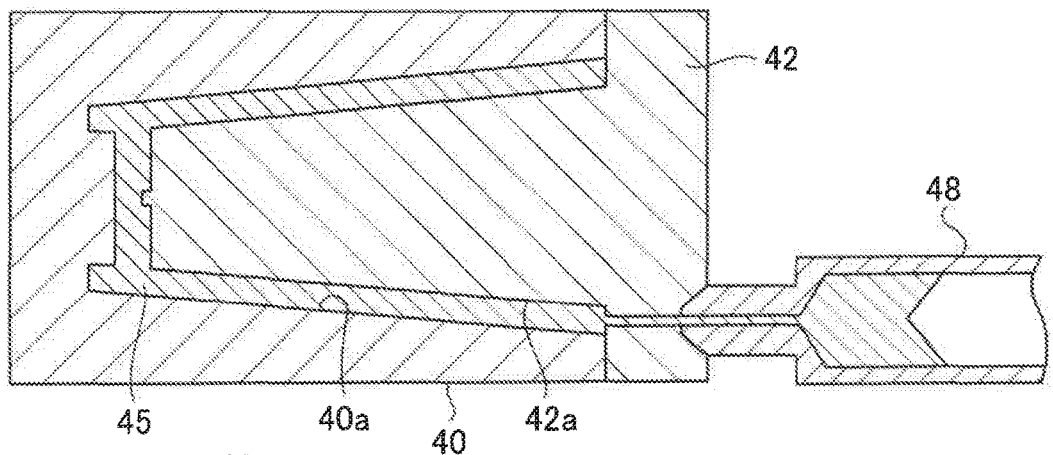
FIGS. 11A to 11C are cross-sectional views illustrating the process illustrated in FIG. 10 performed for the production of a lithium ion cell according to the third embodiment based on the production method of the present invention.
Figure 11B:
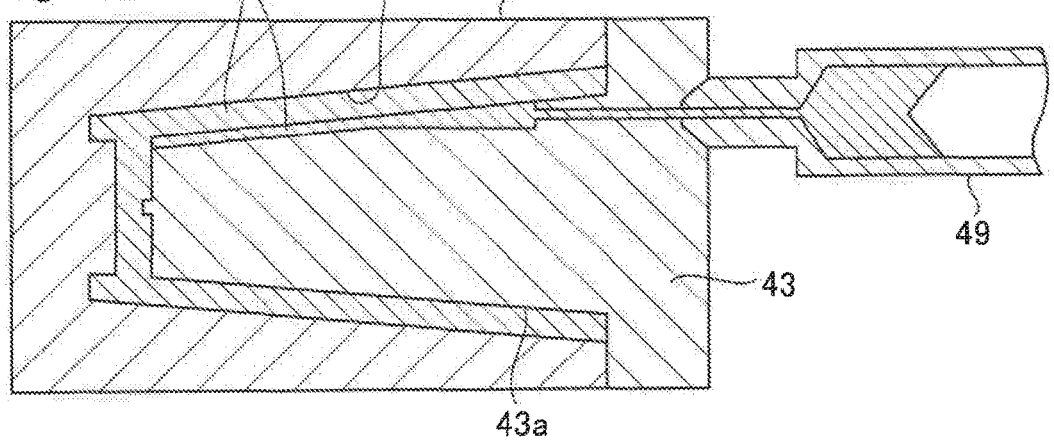
Figure 11C:
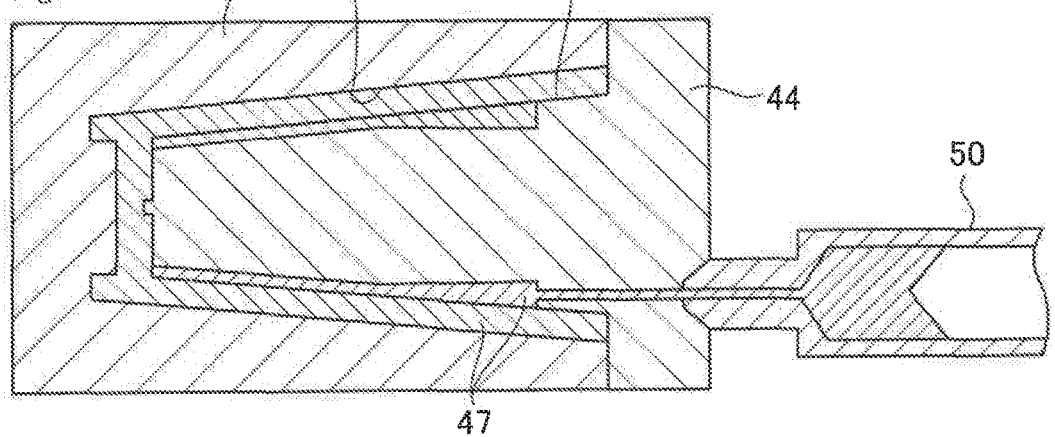
Figure 12:
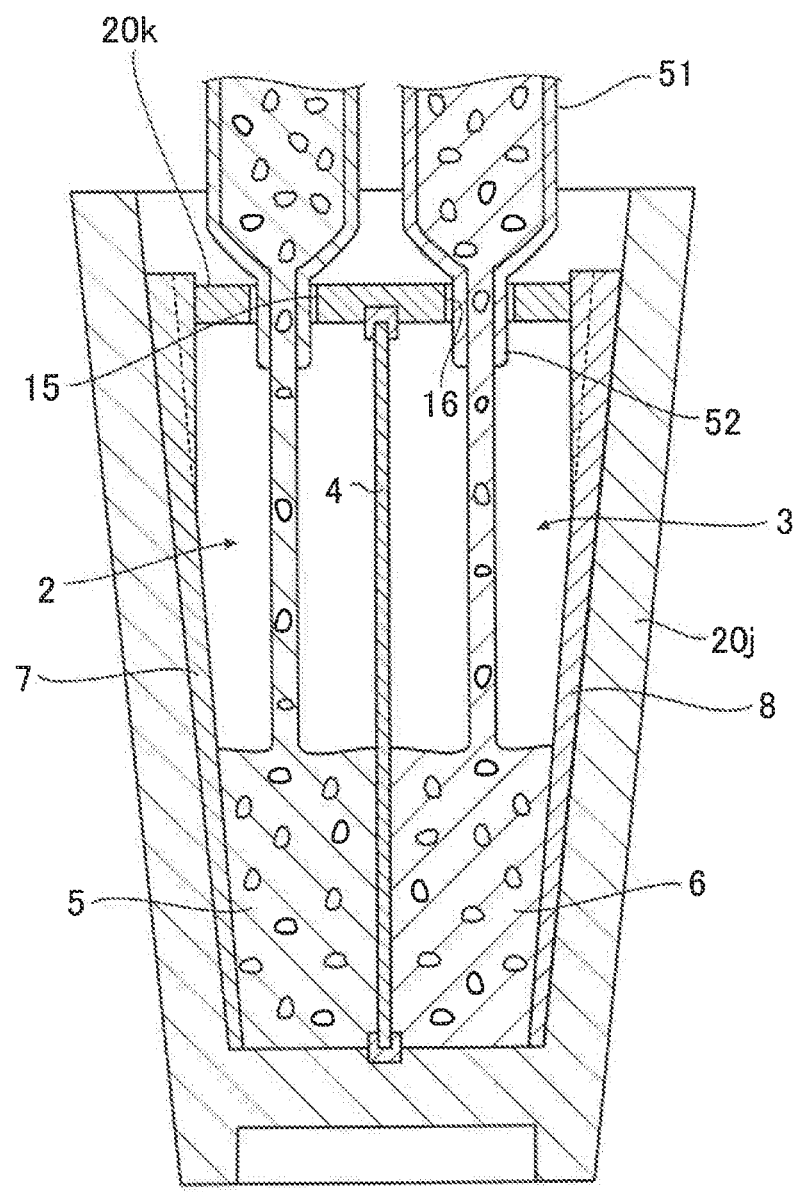
FIG. 12 is a cross-sectional view illustrating a separate process additionally performed for the production of a lithium ion cell according to the third embodiment based on the production method of the present invention.

Next, referring to FIG. 10 to FIG. 12, a production method of the lithium ion cell according to the third embodiment, which is produced by the production method of the present invention, is described. FIG. 10 is a drawing illustrating, when seen from above, one process to be performed during the production of the lithium ion cell according to the third embodiment based on the production method of the present invention. FIGS. 11A to 11C are cross-sectional views illustrating the process illustrated in FIG. 10, which is to be performed during the production of the lithium ion cell according to the third embodiment on the basis of the production method of the present invention. FIG. 12 is across-sectional view illustrating another process to be additionally performed during the production of the lithium ion cell according to the third embodiment based on the production method of the present invention.

First, the first divided container 20j is molded by using a mold. Subsequently, in a similar fashion, the positive electrode current collector 7 and the negative electrode current collector 8 are sequentially molded within the molded first divided container 20j by using the molds.

As illustrated in FIG. 10 and FIGS. 11A to 11C, the first divided container 20j is molded in a gap 45 by three-color injection molding process, and subsequently, the positive electrode current collector 7 and the negative electrode current collector 8 are respectively molded in a gap 46 and a gap 47.

As illustrated in FIGS. 11A to 11C, reference numeral 40 denotes a first mold having a depression part 40a that corresponds to the shape of an outer surface of the first divided container 20j. In the present embodiment, three first molds 40 are prepared, as illustrated in FIG. 10. These first molds 40 are fixed on a rotatable turntable 41 so as to be rotatable.

Reference numeral 42 denotes a second mold having a first protrusion part 42a that corresponds to the shape of an inner surface of the first divided container 20j. Reference numeral 43 denotes a third mold having a second protrusion part 43a that corresponds to the shape of an inner surface formed by combining the shape of the inner surface of the positive electrode current collector 7 and the shape of the inner surface of the first divided container 20j. Reference numeral 44 denotes a fourth mold having a third protrusion part 44a that corresponds to the shape of an inner surface formed by combining the shape of the inner surface of the positive electrode current collector 7, the shape of the inner surface of the negative electrode current collector 8, and the shape of the inner surface of the first divided container 20j.

Therefore, the gap 45 matching the first divided container 20j is formed between the depression part 40a and the first protrusion part 42a. The gap 46 matching the first divided container 20j and the positive electrode current collector 7 is formed between the depression part 40a and the second protrusion part 43a. The gap 47 is formed between the depression part 40a and the third protrusion part 44a. The gap 47 matches the first divided container 20j, the positive electrode current collector 7, and the negative electrode current collector 8.

An injector 48 is provided so as to be in communication with the gap 45 and hold an organic polymer, which is used to mold the first divided container 20j, in fluidized state by melting it by heating and the like. Furthermore, an injector 49 is provided so as to be in communication with the gap 46 and hold an electrically conductive polymer composite, which is used to mold the positive electrode current collector 7, in fluidized state by melting it by heating and the like. Still furthermore, an injector 50 is provided so as to be in communication with the gap 47 and hold an electrically conductive polymer composite, which is used to mold the negative electrode current collector 8, in fluidized state by melting it by heating and the like.

As illustrated in FIG. 11A, when the organic polymer in fluidized state is injected into the gap 45 from the injector 48, the first divided container 20j having the shape that matches the gap 45 is molded because the first mold 40 and the second mold 42 are kept at a temperature lower than the melting temperature of the organic polymer.

Subsequently, as illustrated in FIG. 11B, the second mold 42 is replaced with the third mold 43, and the electrically conductive polymer composite in fluidized state is injected into the gap 46. Since, of the gap 46, the first divided container 20j has been already molded on part that matches the gap 45, the positive electrode current collector 7 is integrally molded together with the first divided container 20j within the gap 46.

Furthermore, as illustrated in FIG. 11C, the third mold 43 is replaced with the fourth mold 44, and the electrically conductive polymer composite in fluidized state is injected into the gap 47. Since, of the gap 47, the first divided container 20j has been already molded on part that matches the gap 45, the negative electrode current collector 8 is integrally molded together with the first divided container 20j within the gap 47.

As illustrated in FIG. 10, by repeating the foregoing injection processes while turning the turntable 41 by 120 degrees, the first divided container 20j, in which the positive electrode current collector 7 and the negative electrode current collector 8 are molded on the inner surface thereof, may be molded by three-color injection molding technology by successively performing the process of outer container molding and the current collector forming process.

Alternatively, after the molding of the first divided container 20j, but before the process of molding the positive electrode current collector 7 and the negative electrode current collector 8 on the inner surface of the first divided container 20j, an electrically conductive layer such as a metal foil and the like may be disposed on the inner surface of the first divided container 20j.

Next, as illustrated in FIG. 12, after arranging the second divided container 20k on a top plane of the first divided container 20j in which the positive electrode current collector 7 and the negative electrode current collector 8 are molded on the inner surface thereof, the positive electrode chamber 2 and the negative electrode chamber 3 formed in the first divided container 20j are respectively filled with the positive electrode composition and the negative electrode composition through the through-hole 15 and the through-hole 16 formed in the second divided container 20k. The method of filling with the positive electrode composition and the negative electrode composition is not limited to any particular method. In FIG. 12, a method is employed in which the positive electrode composition and the negative electrode composition are respectively stored in tanks 51 and injected through nozzles 52. There are two sets of the tanks 51 and the nozzles 52 for the positive electrode and the negative electrode, and these two sets of the tanks 51 and the nozzles 52 are connected to the through-hole 15 and the through-hole 16, respectively. After filling the positive electrode chamber 2 and the negative electrode chamber 3 with the positive electrode composition and the negative electrode composition, the through-hole 15 and the through-hole 16 are respectively sealed with the plug 17 and the plug 18. This enables the production of the lithium ion cell L" according to the third embodiment.

The lithium ion cell L" according to the third embodiment utilizes the outer container 20 composed of resin molded bodies in which resin current collectors are molded therein. This enables to produce an effect substantially similar to that of the lithium ion cell L according to the first embodiment.

Figure 14:
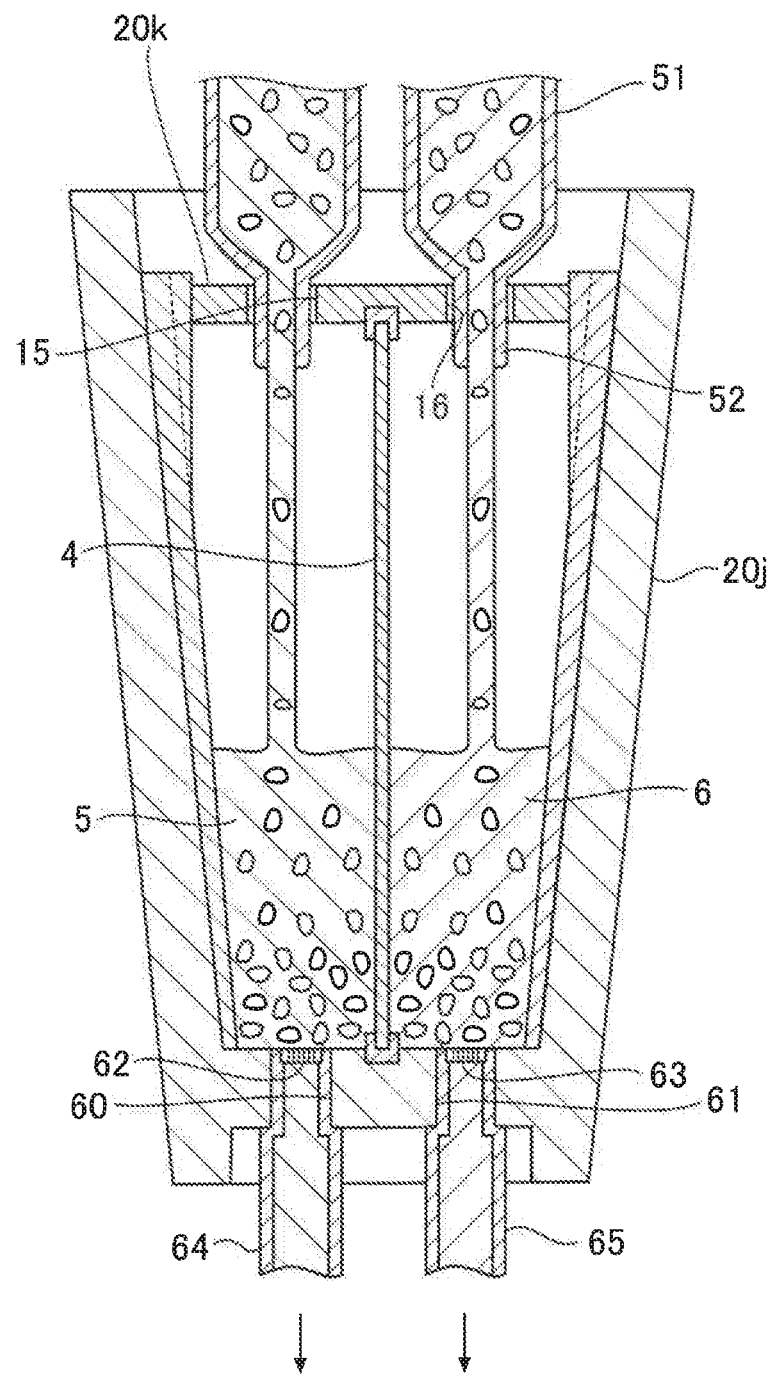
FIG. 14 is a cross-sectional view illustrating a variation example of the process illustrated in FIG. 2.

Next, a variation example of the process illustrated in FIG. 12 described above is described with reference to FIG. 14. FIG. 14 is a cross-sectional view illustrating a variation example of the process illustrated in FIG. 12.

The process illustrated in FIG. 12 and the process illustrated in FIG. 14 are a filling process of filling an electrode composition in each of the positive electrode chamber 2 and the negative electrode chamber 3, but there is a difference in terms of the method. Namely, according to the process illustrated in FIG. 14, the filling process of filling an electrode composition in each of the positive the electrode chamber 2 and the negative electrode chamber 3 includes an injection process of filling a mixture containing an active material particle and a liquid to each of the positive electrode chamber 2 and the negative electrode chamber 3, and a discharge process in which at least part of the liquid contained in the mixture injected during the injection process is passed through a separation film disposed in each of the discharge hole 60 and the discharge hole 61 and discharged from the positive electrode chamber 2 and the negative electrode chamber 3.

To have an achievable discharge process, on bottom of the first divided container 20j in FIG. 14, the discharge hole 60 and the discharge hole 61 which extend from the positive electrode chamber 2 and the negative electrode chamber 3 to the outside are formed. Furthermore, within the holes of the discharge hole 50 and the discharge hole 61, the separation membrane 62 and the separation membrane 63 by which the active material particle and liquid can be separated from each other are disposed, and it is designed such that the liquid contained in the mixture injected to each of the positive electrode chamber 2 and the negative electrode chamber 3 is surely led to the outside via the separation membrane 62 and the separation membrane 63.

The separation membrane 62 and the separation membrane 63 can be used without particular limitation as long as they are a member allowing separation of an active material particle from a liquid. However, it is preferably a member which is formed of the same kind as the separator 4. When an electrode composition is filled in each of the positive electrode chamber 2 and the negative electrode chamber 3, from the viewpoint of the handling property or the like, it is preferable for an electrode composition to be in a state with high fluidity by containing an active material particle and an electrolyte solution (for example, slurry-like). According to the pass through the separation membrane 62 and the separation membrane 63, an excess liquid contained in the electrode composition can be discharged from the positive electrode chamber 2 and the negative electrode chamber 3 while the active material particle contained in the electrode composition is allowed to remain in the positive electrode chamber 2 and the negative electrode chamber 3. As the excess electrolyte solution contained in t electrode composition is discharged from the positive electrode chamber 2 and the negative electrode chamber 3, the ratio of the active material particle contained in an electrode composition, which is injected to the positive electrode chamber 2 and the negative electrode chamber 3, can be increased and the handling property and the cell characteristics can be obtained simultaneously.

Hereinbelow, the process of filling a positive electrode composition in the positive electrode chamber 2 according to this embodiment is described in detail. Furthermore, the process of filling a negative electrode composition in the negative electrode chamber 3 can be also achieved by the same process as the process described below.

First, via the penetration hole 15 formed in the second divided container 20k, a slurry-like positive electrode composition (also referred to as a positive electrode active material slurry) containing a positive electrode active material particle and an electrolyte solution is injected. As for the method for injecting a positive electrode active material slurry to the positive electrode chamber 2, a method of filling, through the nozzle 52, from the tank 51 in which the positive electrode composition is stored is employed in FIG. 14, although it is not limited thereto.

Herein, the positive electrode active material slurry to be injected to the positive electrode chamber 2 is prepared such that, according to discharge of part of the electrolyte solution after injection, the ratio of the positive electrode active material particle contained in the slurry is lower than the ratio of the positive electrode active material particle contained in the positive electrode composition which has been filled in the positive electrode chamber 2.

After that, part of the electrolyte solution contained in the positive electrode material slurry which has been injected to the positive electrode chamber 2 is discharged through the discharge hole 60. As for the discharge method, a method of pressurizing the inside of the positive electrode chamber 2 or a method of suctioning through the discharge hole 60 by using a vacuum pump or the like can be employed. With regard to the method of FIG. 14, the discharge pipe 64 is inserted to the discharge hole 60 and the electrolyte solution discharged via the discharge pipe 64

The positive electrode active material slurry to be injected to the positive electrode chamber 2 can be obtained by dispersing an active material particle and a conductive aid, which is used as necessary, in an electrolyte solution, and the total weight of the active material particle and conductive aid, which is used as necessary, contained in the positive electrode active material slurry is 1 to 50% by weight (or preferably 5 to 30% by weight) based on the total weight of the positive electrode active material slurry. The positive electrode active material slurry injected to the positive electrode chamber 2 is preferably a positive electrode composition which contains, through the discharge process, the active material particle at concentration of 30 to 80% by weight (or preferably 30 to 60% by weight) based on the weight of the electrolyte solution.

Furthermore, it is also possible that part of the electrolyte solution is discharged from the positive electrode chamber 2 during the aforementioned discharge process, and if necessary, a positive electrode active material slurry containing an active material particle and an electrolyte solution is further injected via the penetration hole 15. In that case, the ratio of the active material particle contained in an additionally injected positive electrode active material slurry may be different from the ratio of the active material particle contained in an initially injected positive electrode active material slurry.

Once the positive electrode composition is filled in the positive electrode chamber 2 according to the injection process and the discharge process, it is preferable that vibration, impact, or the like is applied to the first divided container 20*j* to have a state in which the active material particle and electrolyte solution are evenly admixed with each other in the positive electrode chamber 2. After that, the discharge pipe 64 is released, the inside of the positive electrode chamber 2 is de-pressurized and de-aerated, and the discharge hole 60 is sealed by using a sealing member or the like.

Material for forming the sealing member used for sealing of the discharge hole 60 is not particularly limited as long as it is a material which has durability against an electrolyte solution. The same material as the material used for sealing of the first divided container 20*a* and the second divided container 20*b* can be also used, and the preferred materials are the same as above. Sealing of the discharge hole 60 can be performed by filling a sealant containing those materials as a main component in the discharge hole 60.

As described above, filling of the negative electrode chamber 3 with a negative electrode composition can be also achieved by the same process as the process of filling a positive electrode composition in the positive electrode chamber 2 described above. Namely, a slurry-like negative electrode composition (also referred to as negative electrode active material slurry) containing a negative electrode active material particle and an electrolyte solution is injected to the negative electrode chamber 3 via the penetration hole 16. Then, after pass through via the separation membrane 63, the electrolyte solution contained in the injected negative electrode active material slurry is discharged via discharge hole 61 and the discharge pipe 65. After that, the discharge pipe 65 is released, the inside of the negative electrode chamber 3 is de-pressurized and de-aerated, and the discharge hole 61 is sealed by using a sealing member or the like.

Furthermore, the process of filling a positive electrode composition in the positive electrode chamber 2 and a process of filing a negative electrode composition in the negative electrode chamber 3 may be performed either separately or simultaneously. In particular, if injection of a positive electrode active material slurry to the positive electrode chamber 2 and injection of a negative electrode active material slurry to the negative electrode chamber 3 are performed simultaneously, pressure is evenly applied to the separator 4 and breaking or the like of the separator 4 can be prevented, and therefor preferable.

According to a method for producing a lithium ion cell of a third embodiment, as the liquid ratio is high and an active material slurry with low viscosity injected, handling of the active material slurry is easy so that the active material slurry can be easily injected regardless of the shape of the positive electrode chamber 2 and the negative electrode chamber 3. Thereafter, by discharging the liquid contained in the active material slurry from each of the positive electrode chamber 2 and the negative electrode chamber 3, the ratio of the active material particle contained in the electrode composition can be adjusted to a desirable value, and both the handling property and the battery performances can be improved.

Furthermore, the method for producing a lithium ion cell according to the third embodiment is not limited to the descriptions described above. For example, although a positive electrode active material slurry containing an electrolyte solution is injected to the positive electrode chamber 2 in the above, as the active material slurry to be injected to the positive electrode chamber 2, a mixture containing a positive electrode active material particle and a conductive aid, which is used as necessary, as dispersed in a non-aqueous solvent can be used.

When a mixture containing a positive electrode active material particle and a conductive aid, which is used as necessary, as dispersed in a non-aqueous solvent is used, also by discharging most of the non-aqueous solvent from the discharge hole 60 and then injecting, instead of the discharged non-aqueous solvent, the electrolyte solution containing a non-aqueous solvent and an electrolyte via the penetration hole 15, the ratio of the active material particle to be contained in the active material slurry can be adjusted to a desirable value, and both the handling property and the battery performances can be unproved.

Also for filling a negative electrode composition in the negative electrode chamber 3, it is possible that a mixture containing a negative electrode active material particle as dispersed in a non-aqueous solvent is injected, and after discharging the non-aqueous solvent during the discharge process, the electrolyte solution is again injected via the penetration hole 16 to fill the negative electrode composition.

Furthermore, with regard to the above descriptions, the separation membrane 62 and the separation membrane 63 are fixed to the discharge pipe 64 and the discharge pipe 65, and they are released from the discharge pipe 64 and the discharge pipe 65 after completing the discharge process. However, it is also possible that the separation membrane 62 and the separation membrane 63 are directly fixed onto the discharge hole 60 and the discharge hole 61 of the first divided container 20*j* and, even after completion of the lithium ion cell, they remain inside the cell while being fixed to the first divided container 20*j*.

Next, referring to FIGS. 15A and 15B, descriptions are given for a separate process that can be further performed for the method for producing a lithium ion cell of the present invention. FIGS. 15A and 15B are cross-sectional views illustrating the effect of the separate process that can be additionally performed.

According to the method for producing a lithium ion cell of the present invention, a gelling process can be further performed in which, as a positive electrode active material slurry and a negative electrode active material slurry, a positive electrode active material slurry and a negative electrode active material slurry, each containing thermal polymerization monomers, are injected to the positive electrode chamber 2 and the negative electrode chamber 3, and the thermal polymerization monomers are polymerized by heating or the like to prepare a positive electrode composition and a negative electrode composition in gel-like form.

As for the thermal polymerization monomer, a monomer or an oligomer having two or more thermal polymerization groups in the molecule and a mixture thereof can be mentioned. Among the thermal polymerization monomers, a thermal polymerization monomer which can form a positive electrode composition and a negative electrode composition in gel-like form as the polymerized product of a thermal polymerization monomer forms a cross-linked polymer, or a mixture thereof can be selected and used.

Examples of the thermal polymerization monomer include bifunctional (meth)acrylate such as ethylene glycol di(meth)acrylate, diethylene glycol di(meth)acrylate, triethylene glycol di(meth)acrylate, tetraethylene glycol di(meth)acylate, propylene di(meth)acrylate, dipropylene di(meth)acrylate, tripropylene di(meth)acrylate, 1,3-butane diol di(meth)acrylate, 1,4-butane diol di(meth)acrylate, or 1,6-hexane diol di(meth)acrylate, trifunctional (meth)acrylate such as trimethylol propane tri(meth)acrylate or pentaerythritol tri(meth)acrylate, and tetrafunctional (meth)acrylate such as ditrimethylol propanetetra(meth)acrylate or pentaerythritol tetra(meth)acrylate, but it is not limited thereto In addition to the above, a reactive oligomer like urethane (meth)acrylate can be also used. The thermal polymerization monomer is preferably used in combination of two or more types.

Amount of the thermal polymerization monomer (when two or more types are used in combination, it indicates the total weight) used is not particularly limited. However, from the viewpoint of the structural stability of an electrode and the ion conductivity, which are contradictory to each other, it is preferably 0.1 to 30% by weight, more preferably 1 to 20% by weight, even more preferably 4 to 10% by weight, and particularly preferably 5 to 10% by weight relative to the weight of an electrolyte solution (that is, total weight of an electrolyte and an organic solvent). When the use amount of the thermal polymerization monomer is within the above range, the cycle characteristics are further improved, and thus desirable.

The thermal polymerization monomer is a mixture of a bifunctional monomer having at least two polymerizable functional groups and a monomer having 3 or more polymerizable groups, and it is preferable to use additionally a thermal polymerization initiator in combination. When the thermal polymerization monomer as a mixture of the above is polymerized by heat, a positive electrode composition and a negative electrode composition in gel-like form having required ion conductivity and gel hardness can be obtained.

Type of the thermal polymerization initiator is not particularly limited. However, those allowing polymerization of a thermal polymerization monomer at a temperature at which the electrolyte solution is not decomposed and suppressing easy oxidation or reduction of the decomposed product of a thermal polymerization initiator are preferable. Examples of such thermal polymerization initiator which may be used include t-butylperoxypyvalate, t-butylperoxyneodecanate, t-hexylperoxyneodecanate, t-hexylperoxypyvalate, t-butylperoxy-2-ethylhexanoate, and t-butylperoxyisobutyrate.

The gelling process can be performed by filling the positive electrode chamber 2 and the negative electrode chamber 3 with a positive electrode active material slurry and a negative electrode active material slurry, respectively, each containing a thermal polymerization monomer, increasing the temperature to polymerization temperature after placing them in an incubator, and keeping them at the temperature conditions for a pre-determined time. The thermal polymerization t e is not particularly limited, but it is generally 10 to 300 minutes.

When the positive electrode composition and negative electrode composition have low viscosity and high fluidity, as exemplified in FIG. 15B, there is a possibility of having a deterioration of battery performances as the electrode active material particles are precipitated and separated in the electrode. On the other hand, the lithium ion cell obtained after performing the above gelling process has a positive electrode composition and a negative electrode composition in the gel-like form, and therefore the electrode active material particles are not precipitated separated and a deterioration of battery performances can be prevented.

Furthermore, details of the method for producing a lithium ion cell and the lithium ion cell of the present invention are not limited to those described above, and they can be performed in various modes. For example, although the aforementioned divided container is molded by a multi-color injection molding technique such as two-color injection molding technique or three-color injection molding technique, it is also possible to use a molding technique known in the field, for example, a method of repeating injection molding of each material while changing the mold.

What is claimed is:

1. A method for producing a lithium ion cell having an outer container composed of a resin molded article, the outer container comprising a pair of a first divided container and a second divided container for dividing the outer container, the method comprising:
   a current collector forming process of forming, by using a molding die, a first electrode current collector on the inner surface of the first divided container and a second electrode current collector on the inner surface of the second divided container, each of the first and second electrode current collectors being composed of an electrically conductive polymer composition;
   an electrode slurry filling process of filling, in the first divided container with the molded first electrode current collector, a first electrode composition containing a first electrode active material particle and an electrolyte solution and, in the second divided container with the molded second electrode current collector, a second electrode composition containing a second electrode active material particle and an electrolyte solution; and
   an integration process of oppositely disposing the first divided container filled with the first electrode composition and the second divided container filled with the second electrode composition for integrating the first divided container and the second divided container via a separator.

2. A method for producing a lithium ion cell having an outer container composed of a resin molded article, the outer container comprising a pair of a first divided container and a second divided container for dividing the outer container, the method comprising:
   a current collector forming process of forming, by using a molding die, a first electrode current collector on the inner surface of the first divided container and a second electrode current collector on the inner surface of the second divided container, each of the first and second electrode current collectors being composed of an electrically conductive polymer composition;
   an electrode composition stacking process of stacking, in the first divided container with the molded first electrode current collector, a first electrode active material layer, a separator, and a second electrode active material layer in the order; and
   an integration process of integrating the first divided container and the second divided container in a direction in which the second electrode active material layer accommodated in the first divided container and the second electrode current collector molded on the inner surface of the second divided container are oppositely disposed.

3. A lithium ion cell comprising a power generation part obtained by stacking a first electrode current collector, a first electrode active material layer, a separator, a second electrode active material layer, and a second electrode current collector in the order, and a cell outer container for accommodating the power generation part, wherein the cell outer container is a resin molded article, the first electrode current collector and the second electrode current collector are a current collector composed of an electrically conductive polymer composition, and the first electrode current collector and the second electrode current collector are integrally formed in the outer container.

4. The lithium ion cell according to claim 3, wherein the first electrode active material layer contains a coated first electrode active material particle of which the surface is at least partially coated with a coating agent containing a conductive aid and a resin for coating and the second electrode active material layer contains a coated second electrode active material particle of which the surface is at least partially coated with a coating agent containing a resin for coating.

* * * * *